United States Patent [19]

Saito et al.

[11] Patent Number: 5,173,540
[45] Date of Patent: Dec. 22, 1992

[54] CATALYST COMPONENT FOR PRODUCING HIGHLY CRYSTALLINE OLEFIN POLYMERS AND A PROCESS FOR PRODUCING THE SAME

[75] Inventors: Jun Saito; Akihiko Sanpei, both of Chibaken, Japan

[73] Assignee: Chisso Corporation, Osaka, Japan

[21] Appl. No.: 509,768

[22] Filed: Apr. 17, 1990

[30] Foreign Application Priority Data

Apr. 25, 1989 [JP] Japan .................................. 1-105080
May 16, 1989 [JP] Japan .................................. 1-121950

[51] Int. Cl.$^5$ .......................................... C08F 297/08
[52] U.S. Cl. .................................. 525/247; 525/268; 525/270; 525/288; 525/297; 525/319; 525/323
[58] Field of Search ............... 525/247, 941, 288, 297, 525/323

[56] References Cited

U.S. PATENT DOCUMENTS

| | | | |
|---|---|---|---|
| 4,210,729 | 7/1980 | Hermans et al. | 525/247 |
| 4,210,735 | 7/1990 | Hermans et al. | 526/119 |
| 4,582,878 | 4/1986 | Chiba et al. | 525/68 |
| 4,603,174 | 7/1986 | Okada et al. | 526/274 |
| 4,748,207 | 5/1988 | Kakugo et al. | 525/297 |
| 5,061,755 | 10/1991 | Suga et al. | 525/247 |

FOREIGN PATENT DOCUMENTS 62-275111 11/1987 Japan .
2114581 8/1983 United Kingdom .

Primary Examiner—Carman J. Seccuro, Jr.
Attorney, Agent, or Firm—Fred Philpitt

[57] ABSTRACT

A catalyst component for producing highly crystalline olefin polymers without causing any operational problems and stably and affording therefrom a film having very few occurrence of voids and a superior transparency, and a process for producing the catalyst component, which catalyst component comprises a linear olefin-non-olefin block copolymer having at least one linear olefin block copolymer and at leaast one non-linear olefin polymer block and (a) a titanium trichloride composition or (b) titanium, magnesium, a halogen and an electron donor as components for a carrier, the content of the linear olefin polymer block being 0.1 to 49.5% by weight, the content of the non-linear olefin polymer block being 0.01 to 49.5% by weight, the ratio by weight of the linear olefin polymer block to the non-linear olefin polymer block being 2/98 to 98/2 and in the case of (a), the content of the titanium trichloride composition being 99.89 to 1.0% by weight.

10 Claims, No Drawings

5,173,540

CATALYST COMPONENT FOR PRODUCING HIGHLY CRYSTALLINE OLEFIN POLYMERS AND A PROCESS FOR PRODUCING THE SAME

BACKGROUND OF THE INVENTION

1. Field of the Invention

This invention relates to a catalyst component used for producing highly crystalline olefin polymers and a process for producing the same. More particularly it relates to a catalyst component for producing highly crystalline olefin polymers from which a film having a superior transparency and very few voids is afforded, and a process for producing the same.

2. Description of the Related Art

It has been well known that crystalline olefin polymers such as crystalline polypropylene, etc. are obtained by polymerizing olefins by means of the so-called Ziegler-Natta catalyst comprising a compound of a transition metal of Groups IV to VI of the Periodic Table and an organometal compound of a metal of Groups I to III of the Table. As the transition metal compound catalyst component, various titanium trichloride compositions have been particularly broadly used.

Among these titanium trichloride compositions, those of a type obtained by reducing $TiCl_4$ with an organoaluminum compound, followed by heat treatment, afford a polymer having a good form; thus many improved processes for producing the above type compositions have been researched. For example, a process of reducing $TiCl_4$ with an organoaluminum compound, followed by treating the resulting titanium trichloride with an electron donor and $TiCl_4$ to thereby enhance the catalyst activity and reduce the quantity of amorphous polymers formed (Japanese patent publication No. Sho 53-3,356/1978) and the like processes have been disclosed.

The present inventors have already proposed a number of processes in this field. According to the following processes among the above, the storage stability of titanium trichloride compositions, the polymerization activity, the crystallinity of the resulting olefin polymers, etc. have been notably improved as compared with those of conventional processes:

A process of producing olefin polymers using a titanium trichloride composition obtained by reacting $TiCl_4$ with a reaction product of an organoaluminum compound with an electron donor, followed by reacting the resulting solids with an electron donor and an electron acceptor (Japanese patent publication No. Sho 59-28,573/1984), and A process of producing olefin polymers using a titanium trichloride composition obtained by reacting $TiCl_4$ with a reaction product of an organoaluminum compound with an electron donor, followed by subjecting the resulting solids to polymerization treatment with an olefin and reacting the resulting material with an electron donor and an electron acceptor (Japanese patent application laid-open No. Sho 58-17,104/1983).

Further, on the other hand, in recent years, there has been energetically researched a process for producing olefin polymers which comprises using a titanium-containing solid catalyst component containing Ti, Mg, a halogen and an electron donor, which component exhibits a very high polymerization activity while retaining a high stereo-regularity, and polymerizing olefins in the presence of a catalyst obtained by combining the above solid catalyst component, an organoaluminum compound and an electron donor together (e.g. Japanese patent application laid-open No. Sho 58-83,006/1983, etc.).

The present inventors have also already proposed a number of processes. For example, we have disclosed processes for producing olefin polymers having a high stereoregularity and a good particle form with a high polymerization activity (e.g. Japanese patent application laid-open Nos. Sho 61-209,207/1986, Sho 62-104,810/1987, Sho 62-104,811/1987, Sho 62-104,812/1987, Sho 62-104,813/1987, etc.).

However, while these improved processes are provided with the above-mentioned advantages, films prepared from the resulting polyolefins are translucent so that the commodity value is often damaged depending on the fields of use applications; thus improvement in the transparency has been desired.

On the other hand, improvement in the transparency of films prepared from olefin polymers has been attempted. For example, processes of adding a nucleating agent such as aluminum salts of aromatic carboxylic acids (Japanese patent publication No. Sho 40-1,652/1965), benzylidene sorbitol derivatives (Japanese patent application laid-open No. Sho 51-22,740/1976), etc. to polypropylene have been proposed. However, when aluminum salts of aromatic carboxylic acids are used, their dispersibility in the resulting polymer is not only inferior, but also the effectiveness of improvement in the transparency of the resulting film is insufficient, while when benzylidene sorbitol derivatives are used, a definite improvement in the transparency is observed, but there have been raised problems that their smell at the time of processing is strong, a bleeding phenomenon(exudation) occurs, etc.

For solving the above-mentioned problem at the time of addition of nucleating agents, there have been proposed processes of polymerizing propylene using a catalyst obtained by polymerizing a small quantity of vinylcyclohexane, p-t-butylstyrene, allyltrimethylsilane, 4,4-dimethylpentene-1, etc., followed by preactivation treatment (Japanese patent application laid-open Nos. Sho 60-139,710/1985, Sho 63-15,803/1988, Sho 63-15,804/1988, Sho 63-218,709/1988, etc.). The present inventors produced polypropylene according to the proposed processes, and as a result found that in any of the processes, the polymerization activity of propylene not only lowered, but also there occurred operational problems such as formation of bulk polymer, scale adhesion onto the wall of polymerization vessel, inferior controllability of polymerization reaction, etc. Thus these processes could not be employed in the case of commercial, long term, continuous polymerization, particularly in the case of gas phase polymerization process wherein olefin polymerization was carried out.

Further, when the resulting polypropylene was processed into film, a definite improvement in the transparency was observed, but a large number of voids occurred in the film to thereby damage the commodity value.

Further, as a similar technique, there has been proposed a process of polymerizing propylene using a transition metal catalyst component having vinylcyclohexane polymer, allyltrimethylsilane polymer, etc. added in advance midway during the preparation of the component (Japanese patent application laid-open No. Sho 63-69,809/1988). However, since the proposed process requires a separate step of preparing the vinylcyclohexane polymer, allyltrimethylsilane polymer, etc., commercial disadvantage is not only brought about, but also there has been raised the above-mentioned problem that voids occur in the resulting film as observed in the prior art.

The present inventors have made extensive research on a transition metal catalyst component for producing olefin polymers, having overcome the above-mentioned problems of the prior art, that is, capable of producing crystalline olefin polymers stably and for a long term, and when made into film, affording a film having few voids and an improved transparency. As a result, we have found a titanium trichloride composition or a supported type titanium catalyst component, each having a linear olefin-non-linear olefin block compolymer contained therein according to a specified process, and further have found that when an olefin polymer is produced using a catalyst having at least an organoaluminum compound combined with the above titanium trichloride composition or the supported type titanium catalyst component, the above-mentioned problems of the prior art in the aspect of production and quality can be solved.

SUMMARY OF THE INVENTION

As apparent from the foregoing, the object of the present invention is to provide a titanium trichloride composition as a catalyst component or a supported type catalyst component for producing highly crystalline olefin polymers without causing any operational problems and stably, and affording therefrom a film having very few occurrence of voids and superior transparency and a process for producing the catalyst component.

The present invention has the following constitutions:

(1) A titanium trichloride composition for producing olefin polymers, which composition comprises a linear olefin-non-linear olefin block copolymer having at least one linear olefin polymer block and at least one nonlinear olefin polymer block, and a titanium trichloride composition, the content of said linear olefin polymer block being 0.1 to 49.5% by weight, the content of said non-linear olefin polymer block being 0.01 to 49.5% by weight, the ratio by weight of said linear olefin polymer block to said non-linear olefin polymer block being 2/98 to 98/2 and the content of said titanium trichloride composition being 99.89 to 1.0% by weight.

(2) A titanium trichloride composition according to item (1) wherein said non-linear olefin polymer block is a saturated ring-containing hydrocarbon polymer block consisting of repetition units expressed by the formula

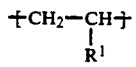

wherein $R^1$ represents a saturated ring-containing hydrocarbon radical of 3 to 18 carbon atoms which has a saturated ring structure of a hydrocarbon which may contain silicon.

(3) A titanium trichloride composition according to item (1) wherein said non-linear olefin polymer block is a branched olefin polymer block consisting of repetition units expressed by the formula

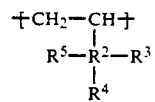

wherein $R^2$ represents a linear hydrocarbon radical of 1 to 3 carbon atoms which may contain silicon or silicon and $R^3$, $R^4$ and $R^5$ each represent a linear hydrocarbon radical of 1 to 6 carbon atoms which may contain silicon, but any one of $R^3$, $R^4$ and $R^5$ may be hydrogen atom.

(4) A titanium trichloride composition according to item (1) wherein said non-linear olefin polymer block is an aromatic polymer block consisting of repetition units expressed by the formula

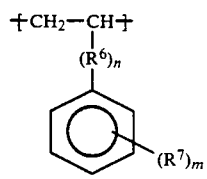

wherein n represents 0 or 1, m represents 1 or 2, $R^6$ represents a linear hydrocarbon radical of 1 to 6 carbon atoms which may contain silicon, $R^7$ represents a hydrocarbon radical of 1 to 12 carbon atoms which may contain silicon, hydrogen atom or a halogen atom and when m represents 2, the respective $R^7$s may be same or different.

(5) A process for producing a titanium trichloride composition for producing olefin polymers, which process comprises reacting $TiCl_4$ with an organoaluminum compound or a reaction product (I) of an organoaluminum compound with an electron donor ($B_1$) to form a solid product (II), subjecting said solid product (II) to a multi-stage polymerization treatment once or more with each of ① a linear olefin and ② a non-linear olefin to form a linear olefin-non-linear olefin block copolymer, and further reacting said block copolymer with an electron donor ($B_2$) and an electron acceptor to form a solid product (III), the content of said linear olefin polymer block in said (III) being made 0.1 to 49.5% by weight and that of said non-linear olefin polymer block therein being made 0.01 to 49.5% by weight and the ratio by weight of said linear olefin polymer block to said non-linear olefin polymer block being 2/98 to 98/2.

(6) A production process according to item (5) wherein said organoaluminum compound is the one expressed by the formula

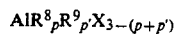

wherein $R^8$ and $R^9$ each represent a hydrocarbon radical such as alkyl group cycloalkyl group, aryl group, etc. or an alkoxy group, X represents a halogen atom and p and p' each represent an optional number satisfying an expression of $$0 < p + p' \leq 3.$$

(7) A production process according to item (5) wherein said non-linear olefin is a saturated ring-containing hydrocarbon monomer expressed by the formula of $CH_2=CH-R^1$ wherein $R^1$ represents a saturated ring-containing hydrocarbon of 3 to 18 carbon atoms which has a saturated ring structure of a hydrocarbon which may contain silicon.

(8) A production process according to item (5) wherein said non-linear olefin is a branched olefin expressed by the formula

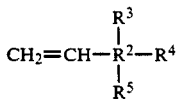

wherein $R^2$ represents a linear hydrocarbon radical of 1 to 3 carbon atoms which may contain silicon or silicon, and $R^3$, $R^4$ and $R^5$ each represent a linear hydrocarbon radical of 1 to 6 carbon atoms which may contain silicon and any one of $R^3$, $R^4$ and $R^5$ may be hydrogen atom.

(9) A production process according to item (5) wherein said non-linear olefin is an aromatic monomer expressed by the formula

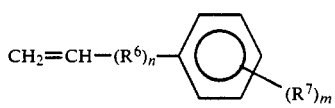

wherein n represents 0 or 1, m represents 1 or 2, $R^6$ represents a linear hydrocarbon radical of 1 to 6 carbon atoms which may contain silicon, $R^7$ represents a hydrocarbon radical of 1 to 12 carbon atoms which may contain silicon, hydrogen atom or a halogen atom, and when m represents 2, the respective $R^7$s may be same or different.

(10) A supported type titanium catalyst component comprising a linear olefin-non-linear olefin block copolymer having at least one linear olefin polymer block and at least one non-linear olefin polymer block and titanium, magnesium, a halogen and an electron donor as indispensable components, the content of said linear olefin polymer block in said block copolymer being 0.1 to 49.5% by weight, the content of said non-linear olefin block copolymer therein being 0.01 to 49.5% by weight and the ratio by weight of said linear olefin polymer block to said nonlinear olefin polymer block being 2/98 to 98/2.

(11) A supported type titanium catalyst component according to item (10), wherein said non-linear olefin polymer block is a saturated ring-containing hydrocarbon polymer block consisting of repetition units expressed by the formula

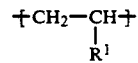

wherein in $R^1$ represents a saturated ring-containing hydrocarbon radical of 3 to 18 carbon atoms which has a saturated ring structure which may contain silicon.

(12) A supported type titanium catalyst component according to item (10), wherein said non-linear olefin polymer block is a branched olefin polymer block consisting of repetition units expressed by the formula

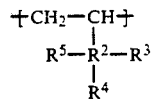

wherein $R^2$ represents a linear hydrocarbon radical of 1 to 3 carbon atoms which may contain silicon or silicon, $R^3$, $R^4$ and $R^5$ each represent a linear hydrocarbon radical of 1 to 6 carbon atoms which may contain silicon and any one of $R^3$, $R^4$ and $R^5$ may be hydrogen atom.

(13) A supported type titanium catalyst component according to item (10), wherein said non-linear olefin polymer block is an aromatic polymer block consisting of repetition units expressed by the formula

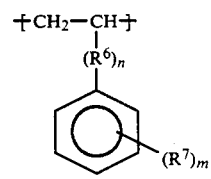

wherein n represents 0 or 1, m represents 1 or 2, $R^6$ represents a linear hydrocarbon radical of 1 to 6 carbon atoms which may contain silicon, $R^7$ represents a hydrocarbon radical of 1 to 12 carbon atoms which may contain silicon, hydrogen atom or a halogen atom and when m represents 2, the respective $R^7$s may be same or different.

(14) A process for producing a supported type titanium catalyst component for producing olefin polymers, which process comprises subjecting a solid product (I) obtained by contacting a liquefied magnesium compound with a depositing agent, a halogen compound, an electron donor and a titanium compound ($T_1$) to a multi-stage polymerization treatment once or more each with ① a linear olefin and ② a non-linear olefin in the presence of an organoaluminum compound to form a linear olefin-non-linear olefin block copolymer as a solid product (II) and reacting a halogenated titanium compound ($T_2$) with said solid product (II), the content of said olefin polymer block in said supported type titanium catalyst component being made 0.1 to 49.5% by weight, that of said non-olefin polymer block therein being made 0.01 to 49.5% by weight and the ratio by weight of said linear olefin polymer block to said non-linear olefin polymer block being 2/98 to 98/2.

(15) A production process according to item (14), wherein said organoaluminum compound is an organoaluminum compound expressed by the formula

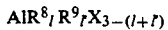

wherein $R^8$ and $R^9$ each represent a hydrocarbon radical selected from the group consisting of an alkyl group, a cycloalkyl group and an aryl group or an alkoxy group, X represents a halogen atom and l and l' each represent an optional number satisfying an expression of $0 < l + l' \leq 3$.

(16) A production process according to item (14), wherein said non-linear olefin is a saturated ring-containing hydrocarbon monomer expressed by the formula

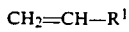

wherein $R^1$ represents a saturated ring-containing hydrocarbon radical of 3 to 18 carbon atoms which has a saturated ring structure of a hydrocarbon which may contain silicon.

(17) A production process according to item (14), wherein said non-linear olefin is a branched olefin expressed by the formula

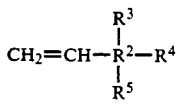

wherein $R^2$ represents a linear hydrocarbon radical of 1 to 3 carbon atoms which may contain silicon or silicon, $R^3$, $R^4$ and $R^5$ each represent a linear hydrocarbon radical of 1 to 6 carbon atoms which may contain silicon and any one of $R^3$, $R^4$ and $R^5$ may be hydrogen atom.

(18) A production process according to item (14), wherein said non-linear olefin is an aromatic monomer expressed by the formula

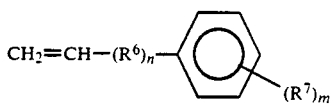

wherein n represents 0 or 1, m represents 1 or 2, $R^6$ represents a linear hydrocarbon radical of 1 to 6 carbon atoms which may contain silicon, $R^7$ represents a hydrocarbon radical of 1 to 12 carbon atoms which may contain silicon, hydrogen atom or a halogen atom and when m represents 2, the respective $R^7$s may be same or different.

BRIEF DESCRIPTION OF THE DRAWINGS

FIGS. 1 and 2 each show a chart of production steps (flowsheet) of the catalyst component, for illustrating the process of the present invention.

DETAILED DESCRIPTION OF PREFERRED EMBODIMENTS

The constitutions of the present invention described in the above items (1) to (9) will be described in more detail.

As described above, the titanium trichloride composition for producing olefin polymers, of the present invention is a titanium trichloride composition comprising a linear olefin-non-linear olefin block copolymer (hereinafter often abbreviated to a specified block copolymer) having at least one linear olefin polymer block and at least one non-linear olefin polymer block, and the production process of the composition will be described below.

The production of the titanium trichloride composition is carried out as follows:

An organoaluminum compound is at first reacted with an electron donor ($B_1$) to obtain a reaction product (I), which is then reacted with $TiCl_4$ or with an organoaluminum compound and $TiCl_4$ to obtain a solid product (II), which is then subjected to a multi-stage polymerization treatment once or more with each of ① an linear olefin and ② a non-linear olefin to form a linear olefin-non-linear olefin block copolymer, which is further reacted with an electron donor ($B_2$) and an electron acceptor to obtain a final solid product (III) which is the titanium trichloride composition of the present invention.

In addition, the terms "polymerization treatment" referred to herein means a process of polymerizing a linear olefin or a non-linear olefin in contact with the solid product (II) under polymerizable conditions thereof. Due to this polymerization treatment, the solid product (II) results in a condition coated with the resulting polymer.

The above-mentioned reaction of an organoaluminum compound with an electron donor ($B_1$) is carried out in a solvent (D) at $-20°$ C. to $+200°$ C., preferably $-10°$ C. to $+100°$ C., for 30 seconds to 5 hours. The addition order of the organoaluminum compound, ($B_1$) and (D) has no particular limitation, and the proportions of these compounds used are 0.1 to 8 mols, preferably 1 to 4 mols, of the electron donor (B) and 0 5 to 5 l, preferably 0.5 to 2 l, of the solvent, each based on one mol of the organoaluminum compound.

Thus, the reaction product (I) is obtained. The product (I) may be subjected to the succeeding reaction without separating it, that is, in a solution state, as it is, where the reaction has been completed (hereinafter referred to often as "reaction solution (I)").

The process of reacting the reaction product (I) with $TiCl_4$ or an organoaluminum compound and $TiCl_4$, followed by subjecting the resulting solid product (II) to a multi-stage polymerization treatment with a linear olefin and a non-linear olefin, includes ① of adding a linear olefin and a non-linear olefin at a multi-stage during an optional process of the reaction of the reaction product (I) with $TiCl_4$ or an organoaluminum compound and $TiCl_4$ to subject the solid product (II) to a multi-stage polymerization treatment, ② a process of adding a linear olefin and a non-linear olefin at a multi-stage after completion of the reaction of the reaction product (I) with $TiCl_4$ or an organoaluminum compound and $TiCl_4$ to subject the solid product (II) to a multi-stage polymerization treatment, and ③ a process of after completion of the reaction of the reaction product (I) with $TiCl_4$ or an organoaluminum compound and $TiCl_4$, separating and removing the resulting liquid portion by filtering-off or decantation, followed by suspending the resulting solid product (II) in a solvent, further adding an organoaluminum compound, adding a linear olefin and a non-linear olefin at a multistage to carry out polymerization treatment with these olefins.

Further, as to the order of the multi-stage polymerization treatment with a linear olefin and a non-linear olefin, either one of the linear olefin and the non-linear olefin may be used in advance, but it is preferred to carry out polymerization treatment at first with ① the linear olefin and successively carry out polymerization treatment with ② the non-linear olefin, in the aspect of polymerization operation properties at the time of using the resulting final titanium trichloride composition and also in the aspect of the quality of the resulting polyolefin. A linear olefin-non-olefin block copolymer is formed by the multi-stage polymerization treatment and the solid product (II) results in a state where it is coated by the solid product (II).

Further, as described above, in the multi-stage polymerization treatment, the linear olefin and the non-linear olefin are used each at least once to thereby obtain the titanium trichloride composition achieving the object of the present invention, but it is also possible to carry out the polymerization treatment twice or more, for example, to carry out polymerization treatment with the non-linear olefin, followed by further adding ③ the linear olefin to carry out polymerization treatment.

The reaction of the reaction product (I) with TiCl$_4$ or an organoaluminum compound and TiCl$_4$ is carried out at $-10°$ C. to $+200°$ C., preferably $0°$ C. to $100°$ C. for 5 minutes to 10 hours irrespective of whether a linear olefin and a non-linear olefin are added or not added during an optional process of the reaction.

It is preferred to use no solvent, but an aliphatic or aromatic hydrocarbon may be used. Mixing of (I) with TiCl$_4$ or an organoaluminum compound and TiCl$_4$ and with a solvent may be carried out in an optional order, and addition of a linear olefin and a non-linear olefin may also be carried out at any stage.

Mixing of the total quantity of (I), TiCl$_4$, an organoaluminum compound and a solvent is preferred to be completed within 5 hours, and the reaction is also carried out during the mixing. After mixing of the total quantity, it is preferred to further continue the reaction within 5 hours.

The respective quantities of the above materials used for the reaction are 0 to 3,000 ml of the solvent and 0.05 to 10, preferably 0.06 to 0.3 in terms of the ratio of the number of aluminum atoms in the reaction product (I) or an organoaluminum compound to the number of Ti atoms in TiCl$_4$ (Al/Ti), based on one mol of TiCl$_4$.

As to the polymerization treatment with a linear olefin and a non-linear olefin, either in the case where a linear olefin and a non-linear olefin are added during an optional process of the reaction of the reaction product (I) with TiCl$_4$ or an organoaluminum compound and TiCl$_4$, or in the case where a linear olefin and a non-linear olefin are added after completion of the reaction of the reaction product (I) with TiCl$_4$ or an organoaluminum compound and TiCl$_4$, the polymerization treatment is carried out at a multi-stage, under conditions of a reaction temperature of $0°$ to $90°$ C., a reaction time of one minute to 10 hours and a reaction pressure of the atmospheric pressure (0 Kgf/cm$^2$G) to 10 Kgf/cm$^2$G, using 0.1 g to 100 Kg of a linear olefin and 0.01 g to 100 Kg of a non-linear olefin based on 100 g of the solid product (II), and so as to give a content of the resulting linear olefin polymer block in the final solid product (III) i.e. the titanium trichloride composition of the present invention, of 0.1 to 49.5% by weight and a content of the resulting non-linear olefin polymer block therein, of 0.01 to 49.5% by weight, and also a ratio by weight of the liner olefin polymer block to the non-linear olefin polymer block of 2/98 to 98/2.

If the content of the linear olefin polymer block is less than 0.1% by weight, the improvement effect in the operational properties at the time of using the resulting titanium trichloride composition and the effect of inhibiting the voids of films prepared from the resulting polyolefin are insufficient, while even if the content exceeds 49.5% by weight, improvement in these effects is not notable, resulting in operational and economical disadvantages.

Further, if the content of the non-linear olefin polymer block is less than 0.01% by weight, improvement effect in the transparency of the resulting films is insufficient, while if it exceeds 49.5% by weight, improvements in the effects are not notable, resulting in operational and economical disadvantages.

Further, the ratio by weight of the linear olefin block polymer to the non-linear olefin polymer block is preferred to be 2/98 to 98/2 in view of the balance among the improvement effect upon the operational properties, the inhibition effect upon the voids and the improvement effect upon the transparency.

In the case where the multi-stage polymerization treatment with a linear olefin and a non-linear olefin is carried out using the solid product (II) obtained by reacting the reaction product (I) with TiCl$_4$ or an organoaluminum compound and TiCl$_4$, followed by separating and removing the resulting liquid portion by filtering off or decantation and suspending the resulting solid product (II) in a solvent, either polymerization treatment with a linear olefin or with a non-linear olefin is carried out at a multi-stage, in the presence of 100 to 5,000 ml of a solvent and 0.5 to 5,000 g of an organoaluminum compound based on 100 g of the solid product (II), under reaction conditions of a reaction temperature of $0°$ to $90°$ C., a reaction time of one minute to 10 hours and a reaction pressure of the atmospheric pressure (0 Kgf/cm$^2$G) to 10 Kgf/cm$^2$G, using 0.1 g to 100 Kg of a linear olefin and 0.01 g to 100 Kg of a non-linear olefin based on 100 g of the solid product (II), and so as to give a content of a linear olefin polymer block in the final solid product (III) i.e. the titanium trichloride composition of the present invention, of 0.1 to 49.5% by weight and a content of a non-linear olefin therein of 0.01 to 49.5% by weight, and a ratio by weight of the linear olefin polymer block to the non-linear olefin polymer block of 2/98 to 98/2.

In any of the above-mentioned multi-stage polymerization treatment, after completion of the polymerization treatments with the linear olefin or the non-linear olefin at the respective stages, the resulting reaction mixture may be used, as it is, for the polymerization treatment at the succeeding stage. Further, it is also possible to remove the coexisting solvent, unreacted linear olefin or non-linear olefin, organoaluminum compound, etc. by filtering-off or decantation, followed by again adding a solvent and an organoaluminum compound and using the resulting material for polymerization treatment with a non-linear olefin or a linear olefin at the succeeding stage.

The solvent used at the time of the polymerization treatment is preferred to be an aliphatic hydrocarbon and the organoaluminum compound may be the same as or different from that used when the reaction product (I) is obtained, or that used for direct reaction with TiCl$_4$ without reacting with an electron donor (B$_1$).

After completion of the reaction, the resulting liquid portion is separated and removed by filtering-off or decantation, followed by repeating washing with a solvent to obtain a solid product subjected to polymerization treatment (hereinafter referred to often as solid product (II-A)), which product may be used in a suspended state in a solvent, as it is, for the succeeding step or may be further dried and taken out in the form of a solid material and used.

The solid product (II-A) is then reacted with an electron donor (B$_2$) and an electron acceptor (F). This reaction may be carried out without any solvent, but use of an aliphatic hydrocarbon affords preferable results.

The quantities of these materials used are 0.1 to 1,000 g, preferably 0.5 to 200 g of (B$_2$), 0.1 to 1,000 g, preferably 0.2 to 500 g of (F) and 0 to 3,000 ml, preferably 100 to 1,000 ml of the solvent, each based on 100 g of the solid product (II-A).

The reaction process includes ①️ a process of simultaneously reacting an electron donor (B₂) and an electron acceptor (F) with the solid product (II-A), ②️ a process of reacting (F) with (II-A), followed by reacting (B₂), ③️ a process of reacting (B₂) with (II-A), followed by reacting (F) and ④️ a process of reacting (B₂) with (F), followed by reacting (II-A), but any of the processes may be employed.

As to the reaction conditions, 40° to 200° C., preferably 50° to 100° C. and 30 seconds to 5 hours are preferred in the processes ①️ and ②️, while in the process ③️, (II-A) is reacted with (B₂) at 0° to 50° C. for one minute to 3 hours, followed by reacting (F) under the same conditions as in the processes ①️ and ②️.

Further in the process ④️, (B₂) is reacted with (F) at 10° to 100° C. for 30 minutes to 2 hours, followed by cooling down to 40° C. or lower, adding (II-A) and thereafter reacting the mixture under the same conditions as in the processes ①️ and ②️.

After completion of the reaction of the solid product (II-A), (B₂) and (F), the resulting liquid portion is separated and removed by filtering-off or decantation, followed by repeated washings with a solvent to obtain a solid product (III) as a titanium trichloride composition for producing olefin polymers, comprising a linear olefin-non-linear olefin block copolymer.

The thus obtained solid product (III) i.e. the titanium trichloride composition of the present invention contains a linear olefin-non-linear olefin block copolymer in a ratio by weight of a linear olefin polymer block to a non-linear olefin polymer block of 2/98 to 98/2, the content of the linear olefin polymer block being 0.1 to 49.5% by weight and that of the non-linear olefin polymer block being 0.01 to 49.5% by weight, and is used as a transition metal compound catalyst component for producing olefin polymers, for olefin polymerization, in combination with at least an organoaluminum compound.

The organoaluminum compound used for producing the titanium trichloride composition of the present invention is expressed by the formula $AlR^8_p R^9_{p'} X_{3-(p+p')}$ wherein $R^8$ and $R^9$ each represent a hydrocarbon radical such as an alkyl group, a cycloalkyl group, an aryl group, etc. or an alkoxy group, X represents a halogen atom and p and p' each represent an optional number satisfying an expression of $0 < p+p' \leq 3$.

Concrete examples of the organoaluminum compound are trialkylaluminums such as trimethylaluminum, triethylaluminum, tri-n-propylaluminum, tri-n-butylaluminum, tri-i-butylaluminum, tri-n-hexylaluminum, tri-i-hexylaluminum, tri-2-methylpentylaluminum, tri-n-octylaluminum, tri-n-decylaluminum, etc., dialkylaluminum monohalides such as diethylaluminum monochloride, di-n-propylaluminum monochloride, di-i-butylaluminum monochloride, diethylaluminum monofluoride, diethylaluminum monobromide, diethylaluminum monoiodide, etc., dialkylaluminum hydrides such as diethylaluminum hydride, etc., aluminum sesqui halides such as methylaluminum sesquichloride, ethylaluminum sesquichloride, etc., and monoalkylaluminum dihalides such as ethylaluminum dichloride, i-butylaluminum dichloride, etc., and besides, alkoxyalkylaluminums such as monoethoxydiethylaluminum, diethoxymonoethylaluminum, etc. may also be used.

These organoaluminum compounds may be used in admixture of two or more kinds.

As the electron donor used in the present invention, various ones mentioned below may be exemplified, but ethers are mainly used as (B₁) and (B₂), and other electron donors are preferred to be used together with ethers.

Examples of compounds used as the electron donors are organic compounds having any atoms of oxygen, nitrogen, sulfur and phosphorus such as ethers, alcohols, esters, aldehydes, aliphatic acids ketones, nitriles, amines, amides, ureas, thioureas, isocyanates, azo compounds phosphines, phosphites, phosphinites, hydrogen sulfide, thioethers, thioalcohols, etc.

Concrete examples thereof are ethers such as diethyl ether, di-n-propyl ether, di-n-butyl ether, diisoamyl ether, di-n-pentyl ether, di-n-hexyl ether, di-i-hexyl ether, di-n-octyl ether, di-i-octyl ether, di-n-dodecyl ether, diphenyl ether, ethylene glycol monoethyl ether, tetrahydrofuran, etc., alcohols or phenols such as methanol, ethanol, propanol, butanol, pentanol, hexanol, octanol, phenol, cresol, xylenol, ethylphenol, naphthol, etc., esters such as methyl methacrylate, ethyl acetate, butyl formate, amyl acetate, vinyl butyrate, vinyl acetate, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, ethyl naphthoate, propyl naphthoate, butyl naphthoate, 2-ethylhexyl naphthoate, ethyl phenylacetate, etc., aldehydes such as acetaldehyde, benzaldehyde, etc., aliphatic acids such as formic acid, acetic acid, propionic acid, butyric acid, oxalic acid, succinic acid, acrylic acid, maleic acid, etc., aromatic acids such as benzoic acid, ketones such as methyl ethyl ketone, methyl isobutyl ketone, benzophenone, etc., nitrile acids such as acetonitrile, etc., amines such as methylamine, diethylamine, tributylamine, triethanolamine, β-(N,N-dimethylamino)ethanol, pyridine, quinoline, α-picoline, 2,4,6-trimethylpyridine, N,N,N',N'-tetramethylethylenediamine, aniline, dimethylaniline, etc., amides such as formamide, hexamethylphosphoric acid triamide, N,N,N',N',N''-pentamethyl-N'-β-dimethylaminomethylphosphoric acid triamide, octamethylpyrophosphoroamide, etc., ureas such as N,N,N',N'-tetramethylurea, etc., isocyanates such as phenyl isocyanate, toluyl isocyanate, etc., azo compounds such as azobenzene, etc., phosphines such as ethylphosphine, triethylphosphine, tri-n-butylphosphine, tri-n-octylphosphine, triphenylphosphine, triphenylphosphine oxide, etc., phosphites such as dimethyl phosphite, di-n-octyl phosphite, triethyl phosphite, tri-n-butyl phosphite, triphenyl phosphite, etc., phosphinites such as ethyldiethyl phosphinite, ethylbutyl phosphinite, phenyldiphenyl phosphinite, etc., thioethers such as diethyl thioether, diphenyl thioether, methyl phenyl thioether, ethylene sulfide, propylene sulfide, etc., thioalcohols such as ethyl thioalcohol, n-propyl thioalcohol, thiophenol, etc.

These electron donors may be used in admixture. The electron donor (B₁) used for obtaining the reaction product (I) and (B₂) reacted with the solid product (II-A) may be either same or different.

The electron acceptor (F) used in the present invention is represented by halides of elements of Groups III to VI of the Periodic Table. Concrete examples thereof are anhydrous aluminum chloride silicon tetrachloride, stannous chloride, stannic chloride, titanium tetrachloride, zirconium tetrachloride, phosphorus trichloride, phosphorus pentachloride, vanadium tetrachloride, antimony pentachloride, etc. and these may be used in admixture. Titanium tetrachloride is most preferred.

As the solvent, the following may be used:

aliphatic hydrocarbons such as n-pentane, n-hexane, n-heptane, n-octane, i-octane, etc., halogenated hydrocarbons used in place of or together with aliphatic hydrocarbons, such as carbon tetrachloride, chloroform, dichloroethane, trichloroethylene, tetrachloroethylene, etc., aromatic hydrocarbons such as napthalene, etc., alkyl derivatives thereof such as mesitylene, durene, ethylbenzene, isopropylbenzene, 2-ethylnaphthalene, 1-phenylnaphthalene, halides thereof such as monochlorobenzene, chlorotoluene, chloroxylene, chloroethylbenzene, dichlorobenzene, bromobenzene, etc.

Examples of the linear olefin used for the polymerization treatment in the present invention are ethylene, propylene, butene-1, pentene-1, hexene-1, etc., and ethylene and propylene are preferably used. These linear olefins may be used alone or in admixture.

The non-linear olefin used for the polymerization treatment in the present invention is as follows:

① saturated ring-containing hydrocarbon monomers of 3 to 18 carbon atoms expressed by the formula $CH_2=CH-R^1$ wherein $R^1$ represents a saturated ring-containing hydrocarbon monomer which has a saturated ring-containing structure of a hydrocarbon which may contain silicon and may contain silicon;

② branched olefins expressed by the formula

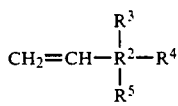

wherein $R^2$ represents a linear hydrocarbon radical of 1 to 3 carbon atoms which may contain silicon or silicon, $R^3$, $R^4$ and $R^5$ each represent a linear hydrocarbon radical of 1 to 6 carbon atoms which may contain silicon, but either one of $R^3$, $R^4$ and $R^5$ may be hydrogen atom; and ③ aromatic monomers expressed by the formula

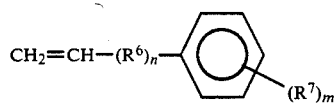

wherein n represents 0 or 1, m represents 1 or 2, $R^6$ represents a linear hydrocarbon radical of 1 to 6 carbon atoms which may contain silicon and $R^7$ represents a hydrocarbon radical of 1 to 12 carbon atoms which may contain silicon, hydrogen atom or a halogen atom and when m represents 2, the respective $R^7$s may be the same or different.

Concrete examples of the saturated ring-containing hydrocarbon monomers ① are vinylcycloalkanes such as vinylcyclopropane, vinylcyclobutane, vinylcyclopentane, 3-methylvinylcyclopentane, vinylcyclohexane, 2-methylvinylcyclohexane, 3-methylvinylcyclohexane, 4-methylvinylcyclohexane, vinylcycloheptane, etc., allylcycloalkanes such as allylcyclopentane, allylcyclohexane, etc., and besides, saturated ring-containing hydrocarbon monomers having silicon atom in the saturated ring-structure such as cyclotrimethylenevinylsilane, cyclotrimethylenemethylvinylsilane, cyclotetramethylenevinylsilane, cyclotetramethylenemethylvinylsilane, cyclopentamethylenevinylsilane, cyclopentamethyleneethylvinylsilane, cyclohexamethylenevinylsilane, cyclohexamethylenemethylvinylsilane, cyclohexamethyleneethylvinylsilane, cyclotetramethyleneallylsilane, cyclotetramethylenemethylallylsilane, cyclopentamethyleneallylsilane, cyclopentamethylenemethylallylsilane, cyclopentamethyleneethylallylsilane, etc., saturated ring-containing hydrocarbon monomers having silicon atom outside the saturated ring structure such as cyclobutyldimethylvinylsilane, cyclopentyldimethylvinylsilane, cyclopentylethylmethylvinylsilane, cyclopentyldiethylvinylsilane, cyclohexylvinylsilane, cyclohexyldimethylvinylsilane, cyclohexylethylmethylvinylsilane, cyclobutyldimethylallylsilane, cyclopentyldimethylallylsilane, cyclohexylmethylallylsilane, cyclohexyldimethylallylsilane, cyclohexylethylmethylallylsilane, cyclohexyldiethylallylsilane, 4-trimethylsilylvinylcyclohexane, 4-trimethylsilylallylcyclohexane, etc.

Concrete examples of the branched olefins ② are 3-position-branched olefins such as 3-methylbutene-1, 3-methylpentene-1, 3-ethylpentene-1, etc., 4-position-branched olefins such as 4-ethylhexene-1, 4,4-dimethylpentene-1, 4,4-dimethylhexene-1, etc., alkenylsilanes such as vinyltrimethylsilane, vinyltriethylsilane, vinyltri-n-butylsilane, allyltrimethylsilane, allylethyldimethylsilane, allyldiethylmethylsilane, allyltriethylsilane, allyl-n-propylsilane, 3-butenyltrimethylsilane, 3-butenyltriethylsilane, etc., diallylsilanes such as dimethyldiallylsilane, ethylmethyldiallylsilane, diethyldiallylsilane, etc.

Further, concrete examples of the aromatic monomers ③ are styrene, as its derivatives, alkylstyrenes such as o-methylstyrene, p-t-butylstyrene, dialkylstyrenes such as 2,4-dimethylstyrene, 2,5-dimethylstyrene, 3,4-dimethylstyrene, 3,5-dimethylstyrene, etc., halogen-substituted styrenes such as 2-methyl-4-fluorostyrene, 2-ethyl-4-chlorostyrene, o-fluorostyrene, p-fluorostyrene, etc., trialkylsilylstyrenes such as p-trimethylsilylstyrene, m-triethylsilylstyrene, p-ethyldimethylsilylstyrene, etc., allyltoluenes such as o-allyltoluene, p-allyltoluene, etc., allylxylenes such as 2-allyl-p-xylene, 4-allyl-o-xylene, 5-allyl-m-xylene, etc., alkenylphenylsilanes such as vinyldimethylphenylsilane, vinylethylmethylphenylsilane, vinyldiethylphenylsilane, allyldimethylphenylsilane, allylethylmethylphenylsilane, etc., 4-(o-tolyl)-butene-1, 1-vinylnaphthalene, etc. These non-linear olefins may be used alone or in admixture.

The thus obtained titanium trichloride composition of the present invention is combined with at least an organoaluminum compound and used as a catalyst for olefin polymerization in a conventional manner, or further preferably the composition is reacted with an olefin and the resulting preactivated catalyst is used for olefin polymerization.

As the organoaluminum compound used for olefin polymerization, organoaluminum compounds same as those used when the above titanium trichloride composition of the present invention is prepared may be used. The organoaluminum compounds may be the same as or different from those used when the titanium trichloride composition is prepared.

Further, examples of olefins used for the above preactivation are linear monoolefins such as ethylene, propylene, butene-1, pentene-1, hexene-1, heptene-1, etc., and branched monoolefins such as 4-methyl-pentene-1, 2-methyl-pentene-1, etc.

These olefins may be same as or different from those as the object of the polymerization, and two kinds or more of olefins may be used in admixture.

The polymerization form in which the above catalyst is used has no particular limitation, but not only liquid phase polymerization such as slurry polymerization or bulk polymerization, but also even gas phase polymerization may be preferably carried out.

In the case of slurry polymerization or bulk polymerization, even a catalyst having the titanium trichloride composition combined with an organoaluminum compound exhibits a sufficient effect, but in the case of gas phase polymerization, a preactivated catalyst obtained by reacting an olefin is preferred.

In the case where slurry polymerization or bulk polymerization is followed by gas phase polymerization, even if the initially used catalyst is the former catalyst, an olefin reaction has already been carried out in the case of gas phase polymerization; hence the catalyst constitutes the same as in the latter one and exhibits a superior effect.

In the preactivation, 0.005 to 500 g of an organoaluminum, 0 to 50 l of a solvent, 0 to 1,000 ml of hydrogen and 0.05 to 5,000 g, preferably 0.05 to 3,000 g of an olefin, each based on 1 g of the titanium trichloride composition are used. An olefin is reacted at 0° to 100° C. for one minute to 20 hours, and it is preferred to react 0.01 to 2,000 g, preferably 0.05 to 200 g of an olefin per g of the titanium trichloride composition.

The preactivation may be carried out in a hydrocarbon solvent such as propane, butane, n-pentane, n-hexane, n-heptane, benzene, toluene, etc., and also may be carried out in a liquefied olefin such as liquefied propylene, liquefied butene-1, etc. or in gaseous ethylene or propylene, and further, may be carried out in the coexistence of hydrogen.

The preactivation may be carried out in the coexistence of polymer particles obtained in advance by slurry polymerization or bulk polymerization or gas phase polymerization. The polymer may be same as or different from the olefin polymer as the object of the polymerization. The quantity of the polymer particles capable of being made coexistent is in the range of 0 to 5,000 g per g of the titanium trichloride composition.

The solvent or olefin used in the preactivation may be removed midway during the preactivation or after completion of the preactivation by distilling-off under reduced pressure or filtering-off, and in order to suspend the solid product in a solvent in a quantity not exceeding 80 l per g of the product, a solvent may be added.

The preactivation process includes various embodiments as follows:

① a process of carrying out slurry reaction, bulk reaction or gas phase reaction in contact of an olefin with a catalyst having the titanium trichloride composition combined with an organoaluminum compound;

② a process of combining the titanium trichloride composition with an organoaluminum compound in the presence of an olefin;

③ process of making an olefin polymer coexistent in the process ① or ②; and

④ a process of making hydrogen coexistent in the process ①, ② or ③.

There is no essential difference between bringing the catalyst into a slurry state and bringing it into powder.

The catalyst consisting of the titanium trichloride composition and an organoaluminum compound combined together as described above, or the catalyst further preactivated with an olefin is used for producing olefin polymers, and it is also possible to add an electron donor as a third component of the catalyst in order to improve its stereoregularity and use the resulting catalyst for polymerization, as in conventional olefin polymerization.

The quantities of the respective catalyst components used are similar to those in conventional olefin polymerization, and concretely, 0.01 to 500 g of an organoaluminum compound and 0 to 200 g of an electron donor per g of the titanium trichloride composition are used.

The polymerization form of polymerizing olefin includes, as described above, ① slurry polymerization carried out in a hydrocarbon solvent such as n-pentane, n-hexane, n-heptane, n-octane, benzene, toluene, etc., ② bulk polymerization carried out in a liquefied olefin such as liquefied propylene, liquefied butene-1, etc., ③ gas phase polymerization carried out in a gas phase of an olefin such as ethylene, propylene, etc. and ④ a process of stepwise combining two or more of the above processes ① to ③.

In any cases, polymerization is carried out at a polymerization temperature of room temperature (20° C.) to 200° C., under a polymerization pressure of the atmospheric pressure (0 Kg/cm$^2$G) to 50 Kg/cm$^2$G and usually for about 5 minutes to 20 hours.

In the polymerization, a suitable quantity of hydrogen is added for controlling the molecular weight, as in conventional polymerization process.

Examples of olefins subjected to polymerization are linear monoolefins such as ethylene, propylene, butene-1, hexene-1, octene-1, etc., branched monoolefins such as 4-methylpentene-1, 2-methylpentene-1, etc., diolefins such as butadiene, isoprene, chloroprene, etc., and homopolymerization of these olefins is not only carried out, but also copolymerization of these olefins with each other or one another, for example, propylene with ethylene, butene-1 with ethylene, propylene with butene-1, etc., propylene with ethylene and butene-1, etc. (combination of three components) is carried out, and further it is also possible to carry out block copolymerization by varying kinds of olefins fed in a multi-stage polymerization.

Next, the constitutions of the present invention described in the above items (10) to (18) will be described in more detail.

The titanium catalyst component for olefin polymerization of the present invention is directed to a supported type titanium catalyst component comprising a linear olefin-non-linear olefin block copolymer (hereinafter often abbreviated to a specified block copolymer) containing at least one linear olefin polymer block and at least one non-linear olefin polymer block and titanium, magnesium, a halogen and an electron donor as indispensable components, and a process for producing the supported type titanium catalyst component will be described below.

The supported type titanium catalyst component referred to herein means a titanium catalyst component supported on a carrier.

Further, the "liquefaction" of magnesium compound referred to herein includes not only a case where the compound itself forms a liquid, but also a case where the compound itself is soluble in a solvent to form a solution and a case where the compound reacts with another compound or forms a complex therewith so that the resulting material is solubilized in a solvent to form a solution. Further, the solution may be that in a state where a colloid form or semi-dissolved form substance is contained, besides that in a state where the compound is completely dissolved.

As the magnesium compound to be liquefied, it may be any of those which form the above-mentioned "liquefied" state. Examples of such compounds are magnesium dihalides, alkoxymagnesium halides, aryloxymagnesium halides, dialkoxymagnesiums, diaryloxymagnesiums, magnesium oxyhalides, magnesium oxide, magnesium hydroxide, magnesium carboxylates, dialkylmagnesiums, alkylmagnesium halides, etc., and besides, metal magnesium may also be used. Further, besides these magnesium compounds or metal magnesium, reaction products thereof with an electron donor, a silicon compound or an aluminum compound may also be used.

As a process for liquefying magnesium compounds, known processes may be employed. Examples thereof are a process of liquefying magnesium compounds with an alcohol, an aldehyde, an amine or a carboxylic acid (Japanese patent application laid-open No. Sho 56-811/1981), a process of liquefying with an o-titanic acid ester (Japanese patent application laid-open No. Sho 54-40,293/1979), a process of liquefying with a phosphorus compound (Japanese patent application laid-open No. Sho 58-19,307/1983), and combinations of these processes, etc. Further, as to organomagnesium compounds having a C-Mg bond which cannot be applied to the above processes, since the compounds are soluble in ether, dioxane, pyridine, etc., they may be used in the form of solution thereof in such solvents, or they may be reacted with an organometal compound to form a complex compound expressed by the formula $M_pMg_qR^{10}{}_rR^{11}{}_s$ (wherein M represents Al, Zn, B or Be atom, $R^{10}$ and $R^{11}$ each represent a hydrocarbon radical, p, q, r and s each are larger than 0 and when the valency of M is denoted by v, then r, s, v, p and q have a relationship of $r+s=vp+2q$) (Japanese patent application laid-open No. Sho 50-139,885/1975), followed by dissolving the complex compound in a hydrocarbon solvent to effect liquefaction.

Further, in the case where metal magnesium is used, liquefaction may be carried out according to a process of liquefying it with an alcohol and an o-titanic acid ester (Japanese patent application laid-open No. Sho 51-51,587/1975) or a process of reacting it with a halogenated alkyl in ether to form the so-called Grignard reagent.

Among the above-mentioned processes of liquefying a magnesium compound, for example, a case where magnesium chloride is dissolved in an inert hydrocarbon solvent $(D_1)$ using a titanic acid ester and an alcohol will be illustrated.

0.1 to 2 Mols of a titanic acid ester, 0.1 to 5 mols of an alcohol and 0.1 to 5 l of a solvent $(D_1)$ each per mol of magnesium chloride are mixed in an optional addition order, followed by heating the resulting suspension with stirring to 40° to 200° C., preferably 50° to 150° C. The time required for the reaction and dissolution is 5 minutes to 7 hours, preferably 10 minutes to 5 hours.

The titanic acid ester refers to an o-titanic acid ester expressed by $Ti(OR^{12})_4$ and a polytitanic acid ester expressed by $R^{13}$-(-Ti(OR^{14})(OR^{15})-)$_t$OR$^{16}$ wherein $R^{12}$, $R^{13}$, $R^{14}$, $R^{15}$ and $R^{16}$ each represent an alkyl group of 1 to 20 carbon atoms or a cycloalkyl group of 3 to 20 carbon atoms and t represents an integer of 2 to 20.

Concrete examples thereof are o-titanic acid esters such as methyl o-titanate, ethyl o-titanate, n-propyl o-titanate, i-propyl o-titanate, n-butyl o-titanate, i-butyl o-titanate, n-amyl o-titanate, 2-ethylhexyl o-titanate, n-octyl o-titanate, phenyl o-titanate, cyclohexyl o-titanate, etc. and polytitanic acid esters such as methyl polytitanate, ethyl polytitanate, n-propyl polytitanate, i-propyl polytitanate, n-butyl polytitanate, i-butyl polytitanate, n-amyl polytitanate, 2-ethylhexyl polytitanate, n-octyl polytitanate, phenyl polytitanate, cyclohexyl polytitanate, etc. The quantity of the polytitanic acid ester used may be that corresponding to the o-titanic acid ester as calculated in terms of o-titanic acid ester units.

As the alcohol, aliphatic saturated or unsaturated alcohols may be used. Concrete examples are monohydric alcohols such as methanol, ethanol, n-propanol, i-propanol, n-butanol, n-amyl alcohol, i-amyl alcohol, n-hexanol, n-octanol, 2-ethylhexanol, allyl alcohol, etc. and polyhydric alcohols such as ethylene glycol, trimethylene glycol, glycerine, etc. Among these, aliphatic saturated alcohols of 4 to 10 carbon atoms are preferred.

Examples of the inert hydrocarbon solvent $(D_1)$ are aliphatic hydrocarbons such as pentane, hexane, heptane, nonane, decane, kerosine, etc., aromatic hydrocarbons such as benzene, toluene, xylene, etc., halogenated hydrocarbons such as carbon tetrachloride, 1,2-dichloroethane, 1,1,2-trichloroethane, chlorobenzene, o-dichlorobenzene, etc. Among these, aliphatic hydrocarbons are preferred.

The solid product (I) is obtained by contacting the above liquefied magnesium compound with a depositing agent $(X_1)$, a halogenated compound $(X_2)$, an electron donor $(B_1)$ and a titanium compound $(T_1)$. Examples of the depositing agent $(X_1)$ are halogenating agents such as halogens, halogenated hydrocarbons, halogen-containing silicon compounds, halogen-containing aluminum compounds, halogen-containing titanium compounds, halogen-containing zirconium compounds, halogen-containing vanadium compounds, etc.

Further, in the case where the liquefied magnesium compounds are the above-mentioned organomagnesium compounds, it is also possible to use active hydrogen-containing compounds such as alcohols, Si-H bond-containing polysiloxanes, etc. The quantity of these depositing agents $(X_1)$ used is 0.1 to 50 mols per mol of magnesium compounds.

Further, examples of the halogen compound $(X_2)$ are halogens and halogen-containing compounds, and compounds similar to the halogenating agents illustrated as examples of the depositing agent are usable, and in the case where halogenating agents are used as the depositing agent, 1 it is not always necessary to newly use the halogen compound $(X_2)$. The quantity of the halogen compound $(X_2)$ used is 0.1 to 50 mols per mol of the magnesium compound.

Examples of the electron donor $(B_1)$ are oxygen-containing electron donors such as alcohols, phenols, ketones, aldehydes, carboxylic acids, organic or inorganic acid esters, ethers, acid amides, acid anhydrides, etc., nitrogen-containing electron donors such as ammonia, amines, nitriles, isocyanates, etc., and phosphorus-containing electron donors such as phosphines, phosphites, phosphinites, etc.

Concrete examples are alcohols such as methanol, ethanol, n-propanol, i-propanol, n-butanol, pentanol, hexanol, octanol, 2-ethylhexanol, allyl alcohol, benzyl alcohol, ethylene glycol, glycerine, etc., phenols such as phenol, cresol, xylenol, ethylphenol, etc., ketones such as acetone, methyl ethyl ketone, methyl isobutyl ketone, acetophenone, benzophenone, etc., aldehydes such as acetaldehyde, propionaldehyde, benzaldehyde, etc., carboxylic acids such as formic acid, acetic acid, propionic acid, butyric acid, valeic acid, etc., aliphatic carboxylic acid esters such as methyl formate, methyl acetate, methyl butyrate, ethyl acetate, vinyl acetate, n-propyl acetate, i-propyl acetate, n-butyl acetate, octyl acetate, phenyl acetate, ethyl propionate, etc., aromatic monocarboxylic acid esters such as methyl benzoate, ethyl benzoate, methyl toluylate, ethyl toluylate, methyl anisate, ethyl anisate, phenyl anisate, etc., aromatic polybasic carboxylic acid esters such as monomethyl phthalate, dimethyl phthalate, diethyl phthalate, di-n-propyl pthalate, mono-n-butyl phthalate, di-n-butyl phthalate, di-i-butyl phthalate, di-n-heptyl phthalate, di-2-ethylhexyl phthalate, di-n-octyl phthalate, diethyl isophthalate, dipropyl isophthalate, dibutyl isophthalate, di-2-ethylhexyl isophthalate, diethyl terephthalate, dipropyl terephthalate, dibutyl terephthalate, di-i-butyl naphthalenecarboxylate, etc., ethers such as methyl ether, ethyl ether, isopropyl ether, butyl ether, amyl ether, tetrahydrofuran, anisole, diphenyl ether, etc., acid amides such as acetic acid amide, benzoic acid amide, toluic acid amide, etc., acid anhydrides such as acetic anhydride, maleic anhydride benzoic anhydride, phthalic anhydride, tetrahydrophthalic anhydride, etc., amines such as ethylamine, tributylamine, aniline, pyridine, picoline, tetramethylethylenediamine, etc., nitriles such as acetonitrile, benzonitrile, etc., phosphines such as ethylphosphine, triethylphosphine, tri-n-butylphosphine, triphenylphosphine, etc., phosphites such as dimethylphosphite, triethylphosphite, triphenylphosphite, etc., phosphinites such as ethyldiethylphosphinite, ethylbutylphosphinite, etc., alkoxysilanes such as tetraethoxysilane, tetrabutoxysilane, etc., and preferably, aromatic monocarboxylic acid esters, aromatic polybasic carboxylic acid esters and alkoxysilanes, and more preferably, aromatic polybasic carboxylic acid esters are used.

As to these electron donors ($B_1$), one or more kinds are used and the quantity thereof used is 0.01 to 5 mols per mol of the magnesium compound.

As the titanium compound ($T_1$) necessary for preparing the solid product (I), there are used halogenated titanium compounds expressed by the formula Ti-$(OR^{17})_{4-u}X_u$ wherein $R^{17}$ represents an alkyl group, a cycloalkyl group or an aryl group, X represents a halogen atom and u represents an optional number satisfying an expression of $0 < u \leq 4$, and o-titanic acid esters and polytitanic acid esters illustrated at the time of the above-mentioned liquefaction of magnesium compounds.

Concrete examples of the halogenated titanium compounds are $TiCl_4$, $TiBr_4$, methoxytitanium trichloride, ethoxytitanium trichloride, propoxytitanium trichloride, butoxytitanium trichloride, phenoxytitanium trichloride, ethoxytitanium tribromide, butoxytitanium tribromide, dimethoxytitanium dichloride, diethoxytitanium dichloride, dipropoxytitanium dichloride, dibutoxytitanium dichloride, diphenoxytitanium dichloride, diethoxytitanium dibromide, dibutoxytitanium dibromide, trimethoxytitanium chlofide, triethoxytitanium chloride, tributoxytitanium chloride, triphenoxytitanium chloride, etc.

As the o-titanic acid esters and polytitanic acid esters, the same as those already mentioned are exemplified. As to these titanium compounds ($T_1$), one or more kinds are used, and in the case where halogenated titanium compounds are used as the titanium compound ($T_1$), since they contain a halogen, the depositing agent ($X_1$) and the halogenated compound ($X_2$) are optionally used.

Further, in the case where a titanic acid ester is used at the time of liquefying the magnesium compound, new use of the titanium compound ($T_1$) is also optional. The quantity of the titanium compound ($T_1$) used is 0.1 to 100 mols per mol of the magnesium compound.

The above-mentioned liquefied magnesium compound, depositing agent ($X_1$), halogenated compound ($X_2$), electron donor ($B_1$) and titanium compound ($T_1$) are contacted with stirring to obtain the solid product (I). At the time of the contact, an inert hydrocarbon ($D_2$) may be used and the respective components may be diluted in advance and used.

As the inert hydrocarbon solvent ($D_2$), those similar to the above ($D_1$) may be illustrated. The quantity thereof used is 0 to 5,000 ml per mol of the magnesium compound.

The process of the contact includes various ones such as

① a process of adding ($X_1$) to a liquefied magnesium compound to deposit solids and contacting ($X_2$), ($B_1$) and ($T_1$) with the solids in an optional order; ② a process of adding ($X_1$) to a solution obtained by contacting a liquefied magnesium compound with ($B_1$) to deposit solids and contacting ($X_2$) and ($T_1$) with the solids in an optional order, ③ a process of contacting a liquefied magnesium compound with ($T_1$), followed by adding ($X_1$) and further contacting ($B_1$) and ($X_2$) with the mixture in an optional order, or the like processes.

While the quantities of the respective components used are in the above-mentioned ranges, these components may be used at a time or at several separated stages. Further, in the case where one component contains an atom or a group characterizing another component, as already described above, it is not always necessary to newly use the other component. For example, in the case where a titanic acid ester is used at the time of liquefying a magnesium compound, ($T_1$) constitutes an optional component to be used, and similarly, in the case where a halogen-containing titanium compound is used as the depositing agent ($X_1$), ($X_2$) and (Ti) constitute optional components to be used, and in the case where a halogenating agent is used as the depositing agent ($X_1$), ($X_2$) constitutes an optional component to be used.

The contact temperature of the respective components is $-40°$ to $+180°$ C., preferably $-20°$ to $+150°$ C., and the contact time thereof is 5 minutes to 8 hours, preferably 10 minutes to 6 hours at each stage, under the atmospheric pressure to 10 Kg/cm$^2$G.

A solid product (I) is obtained in the above contact reaction. The solid product (I) may be successively subjected to the subsequent stage, but it is preferred to wash the product with an inert solvent as already mentioned, in advance.

The solid product (I) obtained according to the above process is then subjected to a multi-stage polymerization treatment with ① a linear olefin and ② a non-linear olefin in the presence of an organoaluminum compound ($AL_1$) to obtain a solid product (II).

As to this multi-stage polymerization treatment, either one of the linear olefin or the non-linear olefin may be used in advance, but it is preferred to subject the product to the polymerization treatment first with ① the linear olefin and successively with ② the non-linear olefin, in the aspect of the polymerization operation properties at the time of use of the resulting final titanium catalyst component as well as in the aspect of the quality of the resulting olefin polymer. A linear olefin-non-linear olefin block copolymer is formed by the multi-stage polymerization treatment, and the solid product (I) results in a state where it is coated with the block copolymer.

In order to obtain the titanium catalyst component achieving the object of the present invention, the multi-stage polymerization treatment may be carried out each at least once using each of the linear olefin and the non-linear olefin, as described above, but it is also possible to carry out the polymerization treatment twice or more, for example, by carrying out polymerization treatment with the non-linear olefin, followed by further adding ③ a linear olefin to carry out polymerization treatment.

As to the conditions of the multi-stage polymerization treatment, adding 100 to 5,000 ml of an inert hydrocarbon solvent ($D_3$) and 0.5 to 5,000 g of an organoaluminum compound ($AL_1$) to 100 g of a solid product (I), under conditions of a reaction temperature of 0° to 90° C., a reaction time of one minute to 10 hours and a reaction pressure of the atmospheric pressure (0 Kgf/cm$^2$G) to 10 Kgf/cm$^2$G, and using 0.1 g to 100 Kg of a linear olefin and 0.01 g to 100 Kg of a non-linear olefin per 100 g of the solid product (II), a multi-stage polymerization treatment is carried out so as to give a content of the linear olefin polymer block in the final solid product (III), i.e. the supported type titanium catalyst component, of 0.1 to 49.5% by weight and a content of the non-linear olefin polymer block therein of 0.01 to 49.5% by weight, and so as to give a ratio by weight of the linear olefin polymer block to the non-linear olefin polymer block, of 2/98 to 98/2.

If the content of the linear olefin polymer block is less than 0.1% by weight, improvement in the operation properties at the time of using the resulting titanium catalyst component as well as the effect of inhibiting the resulting olefin polymer from forming voids are both insufficient, while even if it exceeds 49.5% by weight, improvement in the effects is not notable, resulting in operational and economical disadvantages.

Further, if the content of the non-linear olefin polymer block is less than 0.01% by weight, the effect of improving the transparency, when the resulting polymer is made into film, is insufficient, while if it exceeds 49.5% by weight, improvement in the effects is not notable, resulting in operational and economical disadvantages.

Further, the ratio by weight of the linear olefin polymer block to the non-linear olefin block is preferred to be 2/98 to 98/2, in the aspect of balance between the improvement effect of the operation properties and that of the transparency.

In addition, in the above multi-stage polymerization treatment, after the polymerization treatment with the linear olefin or the non-linear olefin at the respective stages has been completed, it is possible to use the resulting reaction mixture, as it is, for the polymerization treatment at the subsequent stage. Further, it is also possible to remove the coexisting solvent, unreacted linear olefin or non-linear olefin and organoaluminum compound ($AL_1$), etc. by filtering off or decantation, again add a solvent and an organoaluminum compound ($AL_1$) and use the resulting mixture for polymerization treatment with a non-linear olefin or a linear olefin at the succeeding stage.

Further, at the stage of the polymerization treatment, it is also possible to make coexistent a carboxylic acid ester such as ethyl benzoate, methyl toluylate, ethyl anisate, etc. or an electron donor ($B_2$) represented by phenyltriethoxysilane, diphenyldimetooxysilane, methyltriethoxysilane, etc. The quantity thereof used is 0 to 5,000 g per 100 g of the solid product (I).

The organoaluminum compound ($AL_1$) used for the polymerization treatment is expressed by the formula $AlR^8{}_lR^9{}_{l'}X_{3-(l+l')}$ wherein $R^8$ and $R^9$ each represent a hydrocarbon radical such as an alkyl group, a cycloalkyl group, an aryl group, etc., X represents a halogen atom and $l$ and $l'$ each represent an optional number satisfying an expression of $0<l+l'\leq 3$. Its concrete examples are the same as those described above in the inventions of the items (1) to (9) of the present invention.

These organoaluminum compounds may be used in admixture of two kinds or more.

As the solvent ($D_3$), inert hydrocarbon solvents same as the ($D_1$) and ($D_2$) already mentioned may be illustrated.

Examples of the linear olefin used for the polymerization treatment of the present invention are those such as ethylene, propylene, butene-1, pentene-1, hexene-1, etc. and particularly, ethylene and propylene are preferably used. These linear olefins may be used alone or in admixture.

The non-linear olefin, branched olefin and armatic monomer used for the polymerization treatment in the inventions of the above items (10) to (18) of the present invention are the same as described in the above items (1) to (9) of the present invention.

As described above, the multi-stage polymerization treatment is carried out with a linear olefin and a non-linear olefin and the resulting material is washed with an inert hydrocarbon solvent as already mentioned to obtain the solid product (II).

Successively, a halogenated titanium compound ($T_2$) is reacted with the solid product (II) to obtain a titanium catalyst component containing a specified silicon-containing polymer. As the halogenated titanium compound ($T_2$), there is used a halogenated titanium compound expressed by the formula $Ti(OR^{17})_{4-u}X_u$ (wherein $R^{17}$ represents an alkyl group, a cycloalkyl group or an aryl group, X represents a halogen atom and u represents an optional number satisfying an expression of $0<u\leq 4$), as illustrated above as an example of the titanium compound ($T_1$) necessary for preparing the solid product (I). As its concrete examples, similar compounds may also be illustrated, and $TiCl_4$ is most preferred.

The reaction of the solid product (II) with the halogenated titanium compound ($T_2$) is carried out using one mol or more of the halogenated titanium compound ($T_2$) per mol of a magnesium compound in the solid product (II), under conditions of a reaction temperature of 20° to 200° C. and a reaction pressure of the atmospheric pressure to 10 Kg/cm$^2$G and for 5 minutes to 6 hours, preferably 10 minutes to 5 hours. Further, it is also possible to carry out the reaction in the presence of an inert hydrocarbon solvent ($D_4$) and an electron donor ($B_3$), and concretely, an inert solvent and an electron donor same as in the ($D_1$) to ($D_3$) and ($B_1$) already mentioned are used.

The quantities thereof used are preferred to be 0 to 5,000 ml of (D$_4$) per 100 g of the solid product (II) and 0 to 2 mols per mol of (B$_3$) per mol of the magnesium compound in the solid product (II). After the reaction of the solid product (II) with the halogenated titanium compound (T$_2$) and if necessary, further with an electron donor, the resulting solids are separated by filtering-off or decantation, followed by washing with an inert hydrocarbon solvent and removing unreacted substances or byproducts to obtain the solid product (III).

Thus, there is obtained the solid product (III) i.e. the supported type titanium catalyst component used for producting olefin polymers, of the present invention, comprising a linear olefin-non-linear olefin block copolymer in a ratio by weight of the linear olefin polymer block to the non-linear olefin polymer block of 2/98 to 98/2 and containing 0.1 to 49.5% by weight of the linear olefin polymer block and 0.01 to 49.5% by weight of the non-linear olefin polymer block and Ti, Mg, a halogen atom and an electron donor as indispensable components.

The thus obtained titanium catalyst component containing a specified block copolymer, of the present invention can be used in the same manner as in known titanium catalyst components used for producing olefin polymers.

The titanium catalyst component containing a specified block copolymer is combined with an organoaluminum compound (AL$_2$) and an electron donor (B$_4$) to prepare a catalyst, or further a small quantity of an olefin is polymerized on the catalyst to prepare a preactivated catalyst, and the catalysts are then used for olefin polymerization.

As the organoaluminum compound (AL$_2$) used for the olefin polymerization, organoaluminum compounds same as (AL$_1$) used for obtaining the above-mentioned titanium catalyst component of the present invention may be used. Further, as the electron donor (B$_4$), organic acid esters, organosilicon compounds containing a Si-O-C bond such as alkoxysilanes, aryloxysilane compounds, etc., ethers, ketones, acid anhydrides, amines, etc. are preferably used.

Besides the compounds illustrated as electron donors (B$_1$) to (B$_3$) used for producing the above-mentioned titanium catalyst component, the following concrete examples are mentioned:

amines having a large steric hindrance such as 2,2,6,6-tetramethylpiperidine, 2,2,5,5-tetramethylpyrrolidine, organosilicon compounds having a Si-O-C bond such as trimethylmethoxysilane, trimethylethoxysilane, dimethyldimethoxysilane, dimethyldiethoxysilane, diphenyldimethoxysilane, methylphenyldimethoxysilane, diphenyldiethoxysilane, ethyltriethoxysilane, methyltrimethoxysilane, vinyltrimethoxysilane, phenyltrimethoxysilane, methyltriethoxysilane, ethyltriethoxysilane, vinyltriethoxysilane, butyltriethoxysilane, phenyltriethoxysilane, ethyltri-i-propoxysilane, vinyltriacetoxysilane, etc.

The quantities of the respective catalyst components used are the same as those in the case of conventional olefin polymerization, and are concretely about 0.05 to 500 g of organoaluminum compound (AL$_2$) and about 0.01 to 200 g of electron donor (B$_4$) each per g of the titanium catalyst component.

Further, examples of olefins used for the preactivation are linear monoolefins such as ethylene, propylene, butene-1, pentene-1, hexene-1, heptene-1, etc., branched monoolefins such as 4-methyl-pentene-1, 2-methyl-pentene-1, etc.

These olefins may be same as or different from those as the object of the polymerization and may be used in admixture of two kinds or more.

The form of polymerization using the above catalyst has no particular limitation, but not only liquid phase polymerization such as slurry polymerization and bulk polymerization, but also gas phase polymerization may be preferably carried out.

In the case of slurry polymerization or bulk polymerization, even a combined catalyst of the titanium catalyst component with organoaluminum compound (AL$_2$) and electron donor (B$_4$) exhibits a sufficient effectiveness, but in the case of gas phase polymerization, a preactivated catalyst obtained by reacting olefin is preferred.

In the case of slurry polymerization or bulk polymerization, followed by gas phase polymerization, even when the initially used catalyst is the former one, since reaction with an olefin has already been carried out at the time of the gas phase polymerization, the resulting catalyst is the same as the latter one to exhibit a superior effectiveness.

The preactivation may be carried out in an inert hydrocarbon solvent such as propane, butane, n-pentane, n-hexane, n-heptane, benzene, toluene, etc. and also may be carried out in a liquefied olefin such as liquefied propylene, liquefied butene-1, etc. or in gaseous ethylene or propylene, and further, hydrogen gas may be made coexistent in the preactivation In the preactivation, polymer particles obtained by slurry polymerization, bulk polymerization or gas phase polymerization may be made coexistent. Such a polymer may be the same as or different from the olefin polymer as the object of the polymerization. The quantity of the polymer particles made coexistent is 0 to 5,000 g per g of the titanium catalyst component.

The solvent or olefin used at the time of the preactivation may be removed by distilling off under reduced pressure or filtering off midway during the preactivation or after completion of the preactivation, and further in order to suspend the solid product in a solvent in a quantity not exceeding 80 l per g of the product, it is possible to add the solvent to the product.

The thus obtained catalyst obtained by combining the titanium catalyst component of the present invention with the organoaluminum compound (AL$_2$) and the electron donor (B$_4$), or the preactivated catalyst with an olefin, may be used for producing olefin polymers. The polymerization form in which an olefin is polymerized includes, as described above, ①  slurry polymerization carried out in a hydrocarbon solvent such as n-pentane, n-hexane, n-heptane, n-octane, benzene, toluene, etc., ②  bulk polymerization carried out in a liquefied olefin monomer such as liquefied propylene, liquefied butene-1, etc., ③  gas phase polymerization in which an olefin such as ethylene, propylene, etc. is polymerized in gas phase, and ④  a process wherein two or more of the above ①  to ③  are stepwise combined. Any of the processes are carried out at a polymerization temperature of room temperature (20° C.) to 200° C., under a polymerization pressure of the atmospheric pressure (0 Kg/cm$^2$G) to 50 Kg/cm$^2$G and usually for about 5 minutes to 20 hours.

In the polymerization, addition of a suitable quantity of hydrogen gas for controlling the molecular weight, etc. are carried out in the same manner as in conventional polymerization process.

Further, examples of the olefins subjected to polymerization are linear monoolefins such as ethylene, propylene, butene-1, hexene-1, octene-1, etc., branched monoolefins such as 4-methylpentene-1, 2-methylpentene-1, etc., diolefins such as butadiene, isoprene, chloroprene, etc., and these olefins may be subjected not only to homopolymerization, but to copolymerization with one another or with another olefin, for example, in combination of propylene with ethylene, butene-1 with ethylene, propylene with buene-1, etc. or three components of propylene, ethylene and butene-1, etc., and further, block copolymerization may be carried out by varying the kind of the olefin fed at the multi-stage polymerization.

The olefin polymer obtained using the titanium trichloride composition or the titanium catalyst component of the present invention contains a highly stereospecific linear olefin-non-linear olefin block copolymer in an extremely dispersed state; hence when the polymer is made into a film, voids are few and since the non-linear olefin polymer block of the specified block copolymer exhibits a nucleating function at the time of melt-molding, crystallization of the resulting olefin polymer is promoted so that the transparency and crystallinity of the total olefin polymer are enhanced.

In particular, in the case where the olefin polymer produced using the titanium trichloride composition or the titanium catalyst component of the present invention is a linear olefin polymer such as polypropylene, the linear olefin polymer block of the linear olefin-non-linear olefin block copolymer is compatible with the linear olefin polymer such as polypropylene so that occurrence of voids in the film prepared from the olefin polymer is further reduced.

Further, the specified block copolymer introduced into the olefin polymer by using the titanium trichloride composition or the titanium catalyst component of the present invention is a stereoregular high molecular polymer having a high compatibility with the olefin polymer, as described above, so that the copolymer does not bleed onto the surface of the resulting olefin polymer.

EXAMPLE

The present invention will be described in more detail by way of Examples, but it should not be construed to be limited thereto.

The definitions of the terms employed in Examples and Comparative examples and the measurement methods therein are as follows:

TY: This indicates polymerization activity and refers to a polymer yield per gram atom of titan (unit: Kg/gram atom).

II: This indicates stereoregularity and refers to a residual quantity after extraction with n-hexane at 20° C. (unit: % by weight)

BD: Bulk density (unit: g/ml)

MFR: Melt flow rate, JIS K 7210, according to the condition 14 in Table 1 (unit: g/10min.)

Inside haze: This refers to a haze inside a film excluding the surface influence; an olefin polymer powder is made into a film of 150 $\mu$ thick under conditions of a temperature of 200° C. and a pressure of 200 Kg/cm$^2$G by means of a press, followed by applying liquid paraffin onto both the surfaces of the film and measuring the resulting haze according to JIS K 7105 (unit: °C.).

Crystallization temperature: Measured using a differential scanning calorimeter at a temperature-lowering rate of 10° C./min. (unit: °C.).

Flexural elastic modulus: Tetrakis[methylene-3-(3',5'-di-t-butyl-4'-hydroxyphenyl)propionate]methane (0.1 part by weight) and calcium stearate (0.1 part by weight) were blended with an olefin polymer powder (100 parts by weight), followed by granulating the resulting blend by means of an extrusion-granulator having a screw bore diameter of 40 mm, molding the resulting granules by means of an injection-molding machine at a molten resin temperature of 230° C. and a mold temperature of 50° C. to prepare a JIS type test piece, allowing this test piece to stand for 72 hours in a room at a humidity of 50% and at room temperature (23° C.) and measuring the flexural elastic modulus according to JIS K 7203. (unit: Kgf/cm$^2$)

Void: An olefin polymer is granulated in the same manner as in the above item, followed by extruding the resulting granules by means of a T-die type filmmaking machine at a molten resin temperature of 250° C. to prepare a sheet of 1 mm thick by means of a cooling roll at 20° C., heating the sheet by a hot air at 150° C. for 70 seconds, and stretching the sheet in both the longitudinal and lateral directions, each to 7 times the respective original lengths to obtain a biaxially stretched film of 20 $\mu$ thick. The film is observed by means of an optical microscope, followed by measuring the number of voids having a diameter of 10 $\mu$ or larger. A film having 10 voids or less per cm$^2$ was denoted by o; that having 10 to 30 voids per cm$^2$ was denoted by $\Delta$; and that having more than 30 voids per cm$^2$ was denoted by x.

EXAMPLE 1

(1) Preparation of titanium trichloride composition-n-Hexane (6 l), diethylaluminum monochloride (DEAC) (5.0 mols) and diisoamyl ether (12.0 mols) were mixed at 25° C. for 5 minutes, followed by reacting the mixture at the same temperature, for 15 minutes to obtain a reaction solution (I) (the molar ratio of diisoamyl ether/DEAC: 2.4).

TiCl$_4$ (40 mols) was placed in a nitrogen-purged reactor, followed by heating it to 35° C., dropwise adding the total quantity of the above reaction solution (I) over 180 minutes, keeping the mixture at the same temperature for 60 minutes, raising the temperature up to 80° C., further reacting the resulting material for one hour, cooling down to room temperature, removing the supernatant, and 4 times repeating a procedure of adding n-hexane (20 l) and removing the supernatant by decantation to obtain a solid product (II).

The total quantity of this product (II) was suspended in n-hexane (30 l), followed by adding diethylaluminum monochloride (400 g), adding propylene (1.5 Kg) at 30° C., subjecting the mixture to polymerization treatment at the same temperature for one hour, thereafter removing the supernatant by decantation, twice washing the resulting solids with n-hexane (30 l), successively adding n-hexane (30 l) and diethylaluminum monochloride (400 g), making the temperature 40° C., adding vinylcyclohexane (1.9 Kg), subjecting the mixture to polymerization treatment at 40° C. for 2 hours, thereafter removing the supernatant, and 5 times repeating a procedure of adding n-hexane (30 l) and removing the supernatant by decantation to obtain a solid product (II-A) subjected to a multi-stage polymerization treatment with propylene-vinylcyclohexane.

The total quantity of this solid product was suspended in n-hexane (9 l), followed by adding TiCl$_4$ (3.5 Kg) to the resulting suspension at room temperature over about 10 minutes, reacting the mixture at 80° C. for 30 minutes, further adding diisoamyl ether (1.6 Kg), reacting the mixture at 80° C. for one hour, thereafter 5 times repeating a procedure of removing the supernatant, and drying under reduced pressure to obtain a solid product (III) as the titanium trichloride composition of the present invention.

The content of the propylene polymer block in this titanium crichloride composition was 25.0% by weight, the content of the vinylcyclohexane polymer block therein was 25.0% by weight and the titanium content therein was 12.6% by weight.

(2) Preparation of preactivated catalyst

Into a 80 l capacity stainless reactor provided with slant blades and purged with nitrogen gas were added n-hexane (40 l), diethylaluminum monochloride (28.5 g) and the titanium trichloride composition of the present invention (450 g) obtained above in item (1) at room temperature, followed by feeding ethylene (0.5 Nm$^3$) at 30° C. over 2 hours, reacting the mixture (ethylene reacted per g of the titanium trichloride composition: 1.0 g), removing unreacted ethylene, washing with n-hexane and drying to obtain a preactivated catalyst component.

(3) Production of olefin polymer

A polypropylene powder having an MFR of 2.0 (30 Kg) was fed into a 150 l capacity stainless polymerization vessel of L/D=4 provided with a stirrer and purged with nitrogen gas, followed by adding n-hexane to the preactivated catalyst component obtained above in item (2) to prepare a n-hexane suspension of the component in a concentration of 4.0% by weight, and continuously feeding the suspension at a rate of 5.1 mg atom/hr as calculated from titanium atom and a 30% by weight solution of diethylaluminum monochloride in hexane at a rate of 4.2 g/hr in terms of diethylaluminum dichloride.

Further, feeding hydrogen gas so as to keep its concentration in the gas phase of the polymerization vessel at 1.0% by volume and feeding propylene so as to keep the total pressure at 23 Kg/cm$^2$G, the gas phase polymerization of propylene was continuously carried out at 70° C. for 160 hours. During the polymerization, the polymer was continuously withdrawn at a rate of 13.5 Kg/hr so as to give a level of the polymer retained in the polymerization vessel of 45% by volume. The withdrawn polymer was successively subjected to contact treatment with nitrogen gas containing 0.2% by volume of propylene oxide at 95° C. for 30 minutes to obtain polypropylene.

COMPARATIVE EXAMPLE 1

(1) The item (1) of Example 1 was repeated except that the solid product (II) was converted into a substance corresponding to the solid product (II-A) without subjecting the product (II) to the multi-stage polymerization treatment with propylene and vinylcyclohexane, to obtain a titanium trichloride composition.

(2) The item (2) of Example 1 was repeated except that the titanium trichloride composition obtained above in the item (1) was used as a titanium trichloride composition, to prepare a preactivated catalyst component.

(3) The item (3) of Example 1 was carried out except that the preactivated catalyst component obtained above in the item (2) was used as a preactivated catalyst component, to carry out propylene polymerization.

COMPARATIVE EXAMPLE 2

(1) A titanium trichloride composition was obtained in the same manner as in the item (1) of Comparative example 1.

(2) Into the reactor used in the item (2) of Example 1 were added n-hexane (20 l), diethylaluminum monochloride (30 g) and the titanium trichloride composition (180 g) obtained above in the item (1) at room temperature, followed by adding vinylcyclohexane (150 g), reacting the mixture at 40° C. for 2 hours (the quantity of vinylcyclohexane reacted per g of the titanium trichloride composition: 0.5 g), thereafter removing the supernatant by decantation, twice washing the resulting solids with n-hexane (20 l), successively adding n-hexane (20 l) and diethylaluminum monochloride (30 g), making the temperature 30° C., adding propylene (120 g), reacting the mixture at 30° C. for one hour, successively removing the supernatant, washing with n-hexane, filtering and drying to obtain a preactivated catalyst component.

(3) The item (3) of Example 1 was repeated except that the catalyst component obtained above in the item (2) was used as a preactivated catalyst component, to carry out propylene polymerization. As a result, since the resulting bulk polymer clogged the withdrawing piping, propylene polymerization had to be stopped 6 hours after the polymerization initiation.

COMPARATIVE EXAMPLE 3

(1) The item (1) of Comparative example 1 was repeated except that when the reaction solution (I) was reacted with TiCl$_4$, vinylcyclohexane (1.3 Kg) added into n-hexane (100 l was polymerized at 60° C. for 2 hours, separately using a titanium trichloride composition (500 g) obtained in the same manner as in the item (1) of Comparative example 1 and diethylaluminum monochloride (120 g) as catalyst, followed by washing with methanol and drying to obtain a vinylcyclohexane polymer (950 g), grinding this polymer in a 10 l capacity vibration mill at room temperature for 5 hours and suspending the ground polymer in the above-mentioned TiCl$_4$, to obtain a titanium trichloride composition containing 33.3% by weight of the vinylcyclohexane polymer.

(2) The item (2) of Example 1 was repeated except that the titanium trichloride composition obtained above in the item (1) was used in place of the titanium trichloride composition of Example 1, item (2).

(3) The item (3) of Example 1 was repeated except that propylene polymerization was carried out using the preactivated catalyst component obtained above in the item (2) in place of the preactivated catalyst component in Example (1), to obtain a polypropylene.

COMPARATIVE EXAMPLE 4 AND EXAMPLES 2 AND 3

The quantities of propylene and vinylcyclohexane used for the polymerization treatment in Example 1, item (1) were varied to obtain titanium trichloride compositions having the respective contents of the above materials shown in Table listed later. Thereafter, polypropylenes were obtained in the same manner as in the items (2) and (3) of Example 1.

EXAMPLE 4 n-Heptane (4 l), diethylaluminum monochloride (5.0 mols), diisoamyl ether (9.0 mols) and di-n-butyl ether (5.0 mols) were reacted at 18° C. for 30 minutes, followed by dropwise adding the resulting reaction solution into TiCl$_4$ (27.5 mols) at 40° C. over 300 minutes, reacting the mixture at the same temperature for 1.5 hour, raising the temperature up to 65° C., further reacting for one hour, removing the supernatant, 6 times repeating a procedure of adding n-hexane (20 l) and removing the supernatant by decantation, suspending the resulting solid product (II) (1.8 Kg) in n-hexane (40 l), adding diethylaluminum monochloride (500 g), and adding and reacting propylene (0.6 Kg) at 30° C. for one hour, to carry out the first step polymerization treatment.

After lapse of the reaction time, the supernatnat was removed, followed by twice repeating a procedure of adding n-hexane (20 l) and removing the supernatant by decantation, successively adding n-hexane (40 l) and diethylaluminum monochloride (500 g), adding allyltrimethylsilane (3.0 Kg), and reacting the mixture at 50° C. for one hour to carry out the second step polymerization treatment and thereby obtain a solid product (II-A) subjected to a multi-stage polymerization treatment with propylene-allyltrimethylsilane.

After the reaction, the supernatant was removed, followed by twice repeating a procedure of adding n-hexane (20 l) and removing the supernatant by decantation, suspending the solid product (II-A) subjected to the above polymerization treatment in n-hexane (7 l), adding TiCl$_4$ (1.8 Kg) and n-butyl ether (1.8 Kg), reacting the mixture at 60° C. for 3 hours, thereafter removing the supernatant by decantation, three times repeating a procedure of adding n-hexane (20 l), agitating the mixture for 5 minutes, allowing it to stand still and removing the supernatant, drying under reduced pressure to obtain a solid product (III), and polymerizing propylene in the same manner as in the items (2) and (3) of Example 1 except that the above solid product (III) was used as a final titanium trichloride composition.

COMPARATIVE EXAMPLE 5

Example 4 was repeated except that the solid product (II) was converted into a substance corresponding to the solid product (II-A), without the polymerization treatment with propylene and allyltrimethylsilane, to obtain a titanium trichloride composition, and propylene was polymerized using the composition.

EXAMPLE 5

The item (1) of Example 1 was repeated except that diethylaluminum monochloride (5.0 mols) was replaced by di-n-butylaluminum monochloride (4.0 mols) to obtain a reaction solution (I), this solution was dropwise added to TiCl$_4$ at 45° C. and vinylcyclohexane was replaced by 4,4-dimethylpentene-1 (3.0 Kg), to obtain a titanium trichloride composition. Thereafter, propylene was polymerized in the same manner as in the items (2) and (3) of Example 1, to obtain a polypropylene.

COMPARATIVE EXAMPLE 6

Example 5 was repeated except that a multi-stage polymerization treatment with propylene and 4,4-dimethylpentene-1 was not carried out, to obtain a titanium trichloride composition. A polypropylene was then obtained.

EXAMPLE 6

The item (1) of Example 1 was repeated except that a multi-stage polymerization treatment was carried out using 0.9 Kg of propylene and using 3-methylbutene-1 (1.1 Kg) in place of vinylcyclohexane, and further, a mixed solution of SiCl$_4$ (1.8 Kg) with TiCl$_4$ (2.0 Kg) in place of TiCl$_4$ and 2.2 Kg of diisoamyl ether were reacted with the solid product (II-A), to obtain a solid product (III), and this solid product (III) was used as a final titanium trichloride composition. Thereafter, the items (2) and (3) of Example 1 were repeated to obtain a polypropylene.

COMPARATIVE EXAMPLE 7

Example 6 was repeated except that a titanium trichloride composition was obtained without carrying out the multi-stage polymerization treatment with propylene and 3-methylbutene-1, to obtain a polypropylene.

EXAMPLE 7

TiCl$_4$ (27.0 mols) was added to n-hexane (12 l), followed by cooling the mixture down to 1° C., further dropwise adding n-hexane (12.5 l) containing diethylaluminum monochloride (27.0 mols) at 1° C. over 4 hours, thereafter reacting the resulting material at the same temperature for 15 minutes, successively raising the temperature up to 65° C. over one hour, and reacting at the same temperature for one hour.

The supernatant was removed, followed by 5 times repeating a procedure of adding n-hexane (10 l) and removing the supernatant by decantation, suspending a portion (1.8 Kg) of the resulting solid product (II) (5.7 Kg) in n-hexane (50 l), adding diethylaluminum monochloride (350 g), further adding propylene (0.6 Kg) at 30° C., thereafter subjecting it to polymerization treatment at the same temperature for one hour, successively removing the supernatant by decantation, washing the resulting solids with n-hexane (50 l), adding n-hexane (50 l) and diethylaluminum monochloride (350 g), further adding p-trimethylsilylstyrene (6.9 Kg) and subjecting the mixture to polymerization treatment at 40° C. for 2 hours.

After the polymerization treatment, the supernatant was removed, followed by twice repeating a procedure of adding n-hexane (30 l) and removing the supernatant by decantation, suspending the total quantity of the resulting solid product (II-A) subjected to the multi-stage polymerization treatment in n-hexane (11 l), adding diisoamyl ether (1.6 l), agitating the resulting suspension at 35° C. for one hour, 5 times washing with n-hexane (3 l) to obtain treated solids and suspending the solids in a n-hexane solution (6 l) containing 40% by volume of TiCl$_4$.

This suspension was raised to 65° C., followed by reacting it at the same temperature for 2 hours, thereafter three times washing the resulting solids with n-hexane (each time 20 l) and drying under reduced pressure to obtain a solid product (III) as a final titanium trichloride composition.

Successively, in a 200 l capacity polymerization vessel provided with a stirrer having a two-stage turbine element, n-hexane was added to the above titanium trichloride composition to prepare a 4.0% by weight n-hexane suspension, and continuously feeding the suspension at a rate of 12.8 mg atom/hr as calculated from titanium atom and diethylaluminum monochloride at a rate of 6.2 g/hr, each through the same piping and n-hexane at a rate of 21 Kg/hr through a separate piping.

Further, feeding hydrogen so as to keep its concentration in the gas phase of the polymerization vessel at 1.5% by volume, and feeding propylene so as to keep the total pressure at 10 Kg/cm²G, slurry polymerization of propylene was continuously carried out at 70° C. for 120 hours.

During the polymerization, the resulting slurry was continuously withdrawn from the polymerization vessel into a 50 l capacity flash tank so as to give a level of the slurry retained in the polymerization vessel of 75% by volume. The pressure of the slurry was dropped in the flash tank and unreacted propylene was removed, while methanol was fed at a rate of 1 Kg/hr and the slurry was subjected to contact treatment at 70° C. Successively, the solvent was separated from the slurry by means of a centrifugal separator and the resulting material was dried to obtain a product powder at a rate of 10 Kg/hr.

COMPARATIVE EXAMPLE 8

Example 7 was repeated except that the solid product (II) was converted into a substance corresponding to the solid product (II-A) without carrying out the multi-stage polymerization treatment with propylene and p-trimethylsilylstyrene to obtain a titanium trichloride composition. Slurry polymerization of propylene was carried out using the composition in the same manner as in Example 7.

EXAMPLE 8

In the item (1) of Example 1, using propylene in a quantity of 0.9 Kg, and using 2-methyl-4-fluorostyrene (7.6 Kg) in place of vinylcyclohexane, a multi-stage polymerization was carried out to obtain a solid product (II-A) subjected to polymerization treatment, followed by adding TiCl₄ (3.0 Kg) into n-heptane (10 l), adding the total quantity of the above solid product (II-A) and reacting the mixture at 80° C. for 30 minutes.

After completion of the reaction, di-n-pentyl ether (2.8 Kg) was further added, followed by reacting the mixture at 80° C. for one hour to obtain a solid product (III). Gas phase polymerization of propylene was carried out in the same manner as in the items (2) and (3) of Example 1 except that the above solid product (III) was used as a final titanium trichloride composition.

COMPARATIVE EXAMPLE 9

Propylene was polymerized in the same manner as in Example 8 except that a titanium trichloride composition was obtained without carrying out the multi-stage polymerization treatment with propylene and 2-methyl-4-fluorostyrene.

EXAMPLE 9

(1) The item (1) of Example 1 was repeated except that the total quantity of the solid product (II) was suspended in n-hexane (30 l), followed by adding diethylaluminum monochloride (400 g), feeding ethylene (950 Nl) at 30° C. over one hour to carry out a first step polymerization, removing unreacted ethylene, adding vinylcyclohexane (1.9 Kg) without washing the reaction mixture and carrying out a second polymerization treatment at 40° C. for 2 hours, to obtain a solid product (III) as the titanium trichloride composition of the present invention.

(2) The item (2) of Example 1 was repeated except that the titanium trichloride composition obtained above in the item (1) was used as a titanium trichloride composition, to obtain a preactivated catalyst component.

(3) Propylene-ethylene copolymerization was carried out in the same manner as in the item (3) of Example 1 except that the preactivated catalyst component obtained above in the item (2) was used as a preactivated catalyst component and ethylene was further fed at the time of the gas phase polymerization of propylene, so as to keep its concentration in the gas phase in the polymerization vessel at 0.2% by volume, to obtain a propylene-ethylene copolymer.

COMPARATIVE EXAMPLE 10

A propylene-ethylene copolymerization was carried out in the same manner as in the item (1) of Example 9 except that a titanium trichloride composition was obtained without carrying out the multi-stage polymerization treatment with ethylene and vinylcyclohexane and the resulting titanium trichloride composition was used, to obtain a propylene-ethylene copolymer.

The titanium trichloride compositions obtained in the above Examples and Comparative examples, polymerization results therewith and evaluation results thereof are shown in the following Table:

TABLE 1

| Nos. of Examples and Comparative examples | Titanium trichloride composition | | | | Polymerization results | | | | Evaluation results | | | |
|---|---|---|---|---|---|---|---|---|---|---|---|---|
| | Linear olefin polymer block | | Non-linear olefin polymer block | | TY (Kg/ gram atom) | II (wt. %) | BD (g/ml) | MFR (g/10 min) | In- side haze (%) | Crystal- lization temp. (°C.) | Flexural elastic modulus (kgf/cm²) | Void |
| | Name of linear olefin | Content (wt. %) | Name of non- linear olefin | Content (wt. %) | | | | | | | | |
| Ex. 1 | Propylene | 25.0 | Vinylcyclo- hexane | 25.0 | 2650 | 99.8 | 0.49 | 1.7 | 1.4 | 130.6 | 15600 | ○ |
| Com.ex.1 | — | — | — | — | 1710 | 99.6 | 0.49 | 1.8 | 11.6 | 118.4 | 12700 | ○ |
| Com.ex.2 | (*1) | — | (*1) | — | 1200 | 98.9 | 0.40 | 1.4 | 2.8 | 125.4 | 13900 | X |
| Com.ex.3 | — | — | (*2) | (33.3) | 1700 | 99.6 | 0.47 | 1.6 | 2.9 | 125.3 | 13900 | X |
| Com.ex.4 | Propylene | 0.01 | Vinylcyclo- hexane | 0.001 | 1710 | 99.6 | 0.48 | 1.7 | 11.0 | 118.5 | 12800 | ○ |
| Ex. 2 | " | 49.3 | Vinylcyclo- hexane | 1.5 | 2670 | 99.8 | 0.49 | 1.8 | 3.0 | 126.3 | 14400 | ○ |
| Ex. 3 | " | 4.8 | Vinylcyclo- hexane | 47.6 | 2640 | 99.8 | 0.48 | 1.7 | 1.4 | 130.6 | 15600 | ○ |
| Ex. 4 | Propylene | 12.5 | Allyltri- methylsilane | 25.0 | 2390 | 99.6 | 0.50 | 1.6 | 1.3 | 130.3 | 14800 | ○ |
| Com.ex.5 | — | — | — | — | 1550 | 99.5 | 0.49 | 1.6 | 11.8 | 118.0 | 12600 | ○ |
| Ex. 5 | Propylene | 26.3 | 4,4-Dimethyl- pentene-1 | 21.1 | 2190 | 98.5 | 0.48 | 1.8 | 1.7 | 129.9 | 14700 | ○ |

TABLE 1-continued

| Nos. of Examples and Comparative examples | Titanium trichloride composition | | | | Polymerization results | | | | Evaluation results | | | Void |
|---|---|---|---|---|---|---|---|---|---|---|---|---|
| | Linear olefin polymer block | | Non-linear olefin polymer block | | TY (Kg/gram atom) | II (wt. %) | BD (g/ml) | MFR (g/10 min) | Inside haze (%) | Crystallization temp. (°C.) | Flexural elastic modulus (kgf/cm²) | |
| | Name of linear olefin | Content (wt. %) | Name of non-linear olefin | Content (wt. %) | | | | | | | | |
| Com.ex.6 | — | — | — | — | 1500 | 98.0 | 0.48 | 1.7 | 11.9 | 118.2 | 12600 | ◯ |
| Ex. 6 | Propylene | 18.8 | 3-Methyl-butene-1 | 18.8 | 2510 | 98.3 | 0.47 | 1.8 | 1.5 | 130.0 | 15000 | ◯ |
| Com.ex.7 | — | — | — | — | 1640 | 98.0 | 0.47 | 1.7 | 12.6 | 118.1 | 12700 | ◯ |
| Ex. 7 | Propylene | 10.0 | p-Trimethylsilylstyrene | 40.0 | 780 | 99.6 | 0.49 | 1.8 | 2.3 | 129.4 | 14400 | ◯ |
| Com.ex.8 | — | — | — | — | 670 | 99.6 | 0.49 | 1.8 | 12.6 | 118.4 | 12600 | ◯ |
| Ex. 8 | Propylene | 20.0 | 2-Methyl-4-fluorostyrene | 13.3 | 2020 | 98.6 | 0.48 | 1.5 | 2.7 | 127.5 | 14600 | ◯ |
| Com.ex.9 | — | — | — | — | 1370 | 98.5 | 0.48 | 1.6 | 12.8 | 118.2 | 12600 | ◯ |
| Ex. 9 | Ethylene | 25.0 | Vinylcyclohexane | 25.0 | 2700 | 97.5 | 0.46 | 1.9 | 1.1 | 128.0 | 14600 | △ |
| Com.ex. 10 | — | — | — | — | 1730 | 97.2 | 0.46 | 1.9 | 8.8 | 116.5 | 11900 | ◯ |

(*1) Prepared by preactivating the titanium trichloride composition with vinylcyclohexane, followed by further preactivating with propylene (quantities of vinylcyclohexane and propylene reacted with 1 g of titanium trichloride composition: each 0.5 g)
(*2) When the titanium trichloride composition was produced, a vinylcyclohexane polymer separately obtained by polymerization was added.

The main effectiveness of the above items (1) to (9) of the present invention consists in that when the titanium trichloride composition of the present invention is used in olefin polymerization as a transition metal compound catalyst component for producing olefin polymers, it is possible to produce a highly crystalline olefin polymer without causing any operational problems and with a very high productivity and when made into a film, to afford a film having few occurrence of voids and also having a superior clearance.

As apparent from the above-mentioned Examples, when olefin polymers are produced using the titanium trichloride composition of the present invention, a long term stabilized production is possible without any problem in production. Further, films produced using the resulting olefin polymer have an inside haze of 1.1 to 3.0%, that is, have a very high transparency, as compared with the inside hazes about 9 to 13% of films produced from conventional olefin polymers using titanium trichloride compositions containing no specified block copolymer. The crystallization temperature also rose by about 8° C. to about 12° C., resulting in a notably improved crystallinity. As a result, the flexural elastic modulus was also improved (see Examples 1 to 9 and Comparative examples 1, 5 to 10).

Whereas, according to conventional process of introducing the non-linear olefin polymer in a manner other than that of the present invention, an operational problem occurs, and further there are problems that when the resulting olefin polymer is made into film, voids very often occur in the film and improvements in the transparency of film and the crystallinity of the polymer are insufficient due to inferior dispersibility of the polymer (see Comparative examples 2 and 3).

EXAMPLE 10

(1) Preparation of Titanium Catalyst Component

In a stainless reactor provided with a stirrer, decane (3 l), anhydrous magnesium chloride (480 g), n-butyl o-titanate (1.7 Kg) and 2-ethyl-1-hexanol (1.95 Kg) were mixed, followed by heating and dissolving the mixture with stirring at 130° C. for one hour to prepare a uniform solution, making its temperature 70° C., adding diisobutyl phthalate (180 g) with stirring, after lapse of one hour, dropwise adding SiCl₄ (5.2 Kg) over 2.5 hours to deposit solids, further heating at 70° C. for one hour, separating the solids from the solution and washing with hexane to obtain a solid product (I).

The total quantity of the solid product (I) was suspended in hexane (10 l) containing triethylaluminum (450 g) and diphenyldimethoxysilane (145 g), kept at 30° C., followed by adding propylene (630 g), subjecting the mixture to polymerization treatment with stirring at the same temperature for one hour, thereafter removing the supernatant by decantation, twice washing the resulting solids with n-hexane (6 l), successively adding n-hexane (10 l), triethylaluminum (450 g) and diphenyldimethoxysilane (145 g) with stirring, making the temperature 30° C., adding vinylcyclohexane (730 g), subjecting the mixture to polymerization treatment at 30° C. for 2 hours, thereafter removing the supernatant and 4 times repeating a procedure of adding n-hexane (6 l) and removing the supernatant to obtain a solid product (II-A) subjected to a multi-stage polymerization treatment with propylene and vinylcyclohexane.

The total quantity of the solid product (II-A) was mixed with TiCl₄ (5 l) having 1,2-dichloroethane (5 l) dissolved therein, followed by adding diisobutyl phthalate (180 g), reacting the mixture with stirring at 100° C. for 2 hours, removing the resulting liquid phase portion by decantation at the same temperature, again adding 1,2-dichloroethane (5 l) and TiCl₄ (5 l), agitating the mixture at 100° C. for 2 hours, washing with hexane and drying to obtain a solid product (III) as the titanium catalyst component of the present invention.

The titanium catalyst component has a particle form close to sphere and the contents of the propylene polymer block, the vinylcyclohexane polymer block and titanium were 30.8% by weight, 30.8% by weight and 1.2% by weight, respectively.

(2) Preparation of Preactivated Catalyst

Into a 30 l capacity stainless reactor provided with slant blades and purged with nitrogen gas were added n-hexane (20 l), triethylaluminum (1.5 Kg), diphenyldimethoxysilane (480 g) and the catalyst component (260 g) at room temperature, followed by keeping the reactor at 30° C., feeding ethylene (240 Nl) at the same temperature over 2 hours, reacting the mixture (the quantity of ethylene reacted per g of the titanium catalyst component: 1.0 g), and removing unreacted ethylene to obtain a preactivated catalyst.

(3) Production of Olefin Polymer

Into a 80 l capacity, horizontal type polymerization vessel (L/D=3) provided with a stirrer and purged with nitrogen gas was fed a polypropylene powder (20 Kg) having an MFR of 2.0, followed by continuously feeding the above-mentioned preactivated catalyst slurry (containing triethylaluminum and diphenyldimethoxysilane besides the titanium catalyst component) at a rate of 0.286 mg atom/hr as calculated from titanium atom.

Further, hydrogen gas was fed so as to keep its concentration in gas phase at 0.15% by volume and also propylene was fed so as to keep the total pressure at 23 Kg/cm$^2$G, followed by continuously carrying out gas phase polymerization of propylene at 70° C. over 120 hours. During the polymerization period, the resulting polymer was continuously withdrawn from the polymerization vessel so as to give the level of the polymer retained in the polymerization vessel at 60% by volume, at a rate of 10 Kg/hr.

The withdrawn polymer was successively subjected to contact treatment with nitrogen gas containing 0.2% by volume of propylene oxide at 95° C. for 15 minutes to obtain a product powder.

COMPARATIVE EXAMPLE 11

(1) Example 10 (1) was repeated except that a substance corresponding to the solid product (II) was prepared without subjecting the solid product (I) to the multi-stage polymerization treatment with propylene and vinylcyclohexane, to obtain a titanium catalyst component.

(2) Example 10 (2) was repeated except that the titanium catalyst component (100 g) obtained in the above item (1) was used as a titanium catalyst component, to prepare a preactivated catalyst.

(3) Example 10 (3) was repeated except that the preactivated catalyst obtained in the above item (2) was used as a preactivated catalyst, to carry out propylene polymerization.

COMPARATIVE EXAMPLE 12

(1) A titanium catalyst component was obtained in the same manner as in Comparative example 11 (1).

(2) Into the reactor used in Example 10 (2) were fed n-heptane (20 l), the titanium catalyst component (100 g) obtained in the above item (1), diethylaluminum monochloride (400 g) and diphenyldimethoxysilane (120 g), followed by adding vinylcyclohexane (130 g), reacting the mixture at 40° C. for 2 hours (the quantity of vinylcyclohexane reacted per g of the titanium catalyst component: 0.8 g), washing the resulting material with n-heptane and filtering to obtain solids.

Further, to the solids were added n-heptane (20 l), diethylaluminum monochloride (400 g) and diphenyldimethoxysilane (55 g), followed by feeding propylene (120 g) and reacting the mixture at 30° C. for one hour (the quantity of propylene reacted per g of the titanium catalyst component: 0.8 g).

(3) Example 10 (3) was repeated except that the preactivated catalyst slurry was replaced by the catalyst slurry obtained above in the item (2) and further, triethylaluminum was fed at a rate of 1.7 g/hr and diphenyldimethoxysilane was fed at a rate of 0.3 g/hr, through separate feeding ports, respectively, to carry out propylene polymerization. As a result, since the resulting bulk polymer clogged the powder-withdrawing piping, the production had to be stopped 5 hours after the polymerization initiation.

COMPARATIVE EXAMPLE 13

(1) Comparative example 11 (1) was repeated except that in advance of adding diisobutyl phthalate to a uniform solution of anhydrous magnesium chloride, n-butyl o-titanate, 2-ethyl-1-hexanol and decane, vinylcyclohexane (3.6 Kg) added into n-hexane (100 l) was polymerized at 60° C. for 2 hours, using as catalyst, a titanium catalyst component (100 g) separately obtained in the same manner as in Comparative example 11 (1), triethylaluminum (35 g) and diphenyldimethoxysilane (7.5 g), followed by washing with methanol, drying, grinding a portion (440 g) of resulting vinylhexane polymer (3 Kg) in vibrating mill for 5 hours and suspending the resulting material in the above uniform solution, to obtain a titanium catalyst component.

(2) Example 10 (2) was repeated except that the titanium catalyst component obtained above in the item (1) was used as a titanium catalyst component, to obtain a preactivated catalyst.

(3) Example 10 (3) was repeated except that the preactivated catalyst obtained above in the item (2) was fed as a preactivated catalyst so as to keep the total pressure at 23 Kg/cm$^2$G, to carry out propylene polymerization.

COMPARATIVE EXAMPLE 14 AND EXAMPLES 11 AND 12

In Example 10 (1), the respective quantities of propylene and vinylcyclohexane used for the polymerization treatment were varied to obtain titanium catalyst components having the contents thereof as shown in Table listed later. Thereafter, polypropylenes were obtained in the same manner as in Example 10 (2) and (3).

EXAMPLE 13

Anhydrous aluminum trichloride (1.7 Kg) and magnesium hydroxide (0.6 Kg) were reacted at 250° C. for 3 hours while grinding them by means of a vibration mill. As a result, reaction occurred along with evolution of hydrogen chloride gas. After completion of the heating, the reaction mixture was cooled in nitrogen gas current to obtain magnesium-containing solids.

In a stainless reactor provided with a stirrer, decane (6 l), the above magnesium-containing solids (1.0 kg), n-butyl o-titanate (3.4 Kg) and 2-ethyl-1-hexanol (3.9 Kg) were mixed, followed by heating the mixture with stirring at 130° C. for 2 hours and dissolving it together to obtain a uniform solution, making the temperature of the solution 70° C., adding ethyl p-toluylate (0.2 Kg), reacting the mixture for one hour, adding diisobutyl phthalate (0.4 Kg), further reacting the mixture for one hour, dropwise adding SiCl$_4$ stirring over 2 hours 30 minutes, depositing solids, further agitating at 70° C. for one hour, separating the solids from the solution and washing with purified hexane to obtain a solid product (I).

The total quantity of the solid product (I) was suspended in hexane (10 l) containing triethylaluminum (450 g) and methyl p-toluylate (75 g), kept at 25° C., followed by adding propylene (250 g), reacting the mixture with stirring at 25° C. for one hour to carry out the first stage polymerization treatment, thereafter removing the supernatant and twice repeating a procedure of adding n-hexane (6 l) and removing the supernatant by decantation.

Successively, n-hexane (10 l), triethylaluminum (450 g) and methyl p-toluylate (75 g) were added with stirring, followed by adding allyltrimethylsilane (1.3 Kg), reacting the mixture at 25° C. for 2 hours to carry out the second stage polymerization treatment, removing the supernatant and 4 times repeating a procedure of adding n-hexane (6 l) and removing the supernatant by decantation, to obtain a solid product (II) subjected to a multi-stage polymerization treatment with propylene and allyltrimethylsilane.

The total quantity of the solid product (II) together with TiCl4 (10 l) diluted with 1,2-dichloroethane (10 l) were added to diisobutyl phthalate (0.4 Kg), followed by reacting the mixture with stirring at 100° C. for 2 hours, removing the resulting liquid phase portion by decantation at the same temperature, again adding 1,2-dichloroethane (10 l) and TiCl4 (10 l), reacting the mixture with stirring at 100° C. for 2 hours, filtering while hot to obtain solid portion, washing with purified hexane and drying to obtain a solid product (III) as a final titanium catalyst component.

The contents of the propylene polymer block, the allyltrimethylsilane polymer block and Ti in the titanium catalyst component were 15.0% by weight, 35.0% by weight and 1.7% by weight, respectively.

Successively, Example 10 (2) was repeated except that diphenyldimethoxysilane was replaced by phenyltriethoxysilane (500 g) and also the above solid product (III) was used as a titanium catalyst component, to obtain a preactivated catalyst. Thereafter, gas phase polymerization of propylene was carried out in the same manner as in Example 10 (3).

COMPARATIVE EXAMPLE 15

Example 13 was repeated except that a substance corresponding to the solid product (II) was prepared without subjecting the solid product (I) to polymerization treatment with propylene and allyltrimethylsilane, to obtain a titanium catalyst component, with which propylene was polymerized.

EXAMPLE 14

In a stainless reactor provided with a stirrer, n-heptane (8 l), anhydrous magnesium chloride (1.0 Kg) and n-butyl o-titanate (7.4 Kg) were mixed, followed by raising the temperature up to 90° C. with stirring, heating the mixture for 2 hours for dissolution to obtain a uniform solution, cooling the uniform solution down to 40° C., dropwise adding methylhydrogenpolysiloxane (1,500 ml), depositing solids and washing with n-heptane to obtain grey-white solids.

The solids (500 g) and n-heptane (7 l) were placed in a stainless reactor provided with a stirrer, followed by adding diisobutyl phthalate (100 g), after elapse of one hour at 30° C., dropwise adding a mixed solution of SiCl4 (11.3 Kg) with TiCl4 (500 g) over one hour, successively reacting the mixture at 30° C. for 30 minutes and further at 90° C. for one hour, separating the resulting solids from the solution and washing with n-heptane to obtain a solid product (I).

The solid product (I) of 2.5 mols calculated in terms of magnesium atom was suspended in n-heptane (5 l) containing triethylaluminum (200 g) and diphenyldimethoxysilane (60 g) kept at 30° C., followed by adding propylene (200 g) and reacting the mixture with stirring at 30° C. for one hour, to carry out a first stage polymerization treatment.

After lapse of the reaction time, the supernatant was removed, followed by twice repeating a procedure of adding n-heptane (6 l) and removing the supernatant by decantation, successively adding n-heptane (5 l), triethylaluminum (200 g) and diphenyldimethoxysilane (60 g) with stirring, adding 4,4-dimethylpentene-1 (280 g), reacting the mixture at 30° C. for 2 hours to carry out a second stage polymerization treatment, thereafter separating the resulting solids from the solution and washing with n-heptane to obtain a solid product (II) subjected to a multi-stage polymerization with propylene and 4,4-dimethylpentene-1.

The total quantity of the solid product (II) was mixed with an n-heptane solution (12 l) containing TiCl4 (6 l), followed by adding diheptyl phthalate (100 g), reacting the mixture at 50° C. for 2 hours, washing with n-heptane, further adding TiCl4 (150 ml) and washing at 90° C. to obtain a solid product (III). The contents of the propylene polymer block, 4,4-dimethylpentene-1 polymer block and titanium were 25.0% by weight, 25.0% by weight and 1.5% by weight, respectively.

Successively, Example 1 (2) was repeated except that diphenyldimethoxysilane was replaced by t-butyltriethoxysilane (150 g) and also the above solid product (III) (200 g) was used as a titanium catalyst component, to obtain a preactivated catalyst, with which gas phase polymerization of propylene was carried out in the same manner as in Example 10 (3).

COMPARATIVE EXAMPLE 16

Example 14 was repeated except that a substance corresponding to the solid product (II) was prepared without subjecting the solid product (I) with propylene and 4,4-dimethylpentene-1, to obtain a titanium catalyst component, with which gas phase polymerization of propylene was carried out.

EXAMPLE 15

In a stainless reactor provided with a stirrer, n-decane (2.5 l), anhydrous MgCl2 (480 g) and 2-ethyl-1-hexanol (1.95 Kg) were heated at 130° C. for 2 hours for dissolution to obtain a uniform solution, followed by adding phthalic anhydride (111 g) into the solution, and mixing these with stirring at 130° C. to dissolve phthalic anhydride in the uniform solution The thus obtained uniform solution was cooled down to room temperature, followed by dropwise adding the total quantity into TiCl4 (10 l) kept at −20° C., over 1 hr., raising the temperature of the resulting mixed solution up to 110° C. over 4 hours, reacting the resulting material with stirring at the same temperature for 2 hours, separating the resulting solids from the solution and washing with n-hexane to obtain a solid product((I).

The total quantity of the solid product (I) was suspended in n-decane (10 l) containing triethylaluminum (450 g) and diphenyldimethoxysilane (145 g), kept at 40° C., followed by adding propylene (470 g), reactng the mixture with stirring at 40° C. for one hour to carry out a first stage polymerization treatment, thereafter separating the resulting solids from the solution, washing with n-hexane, successively adding n-decane (10 l), triethylaluminum (450 g) and diphenyldimethoxysilane (145 g) with stirring, adding 3-methylbutene-1 (350 g), reacting the mixture at 40° C. for 2 hours to carry out a second stage polymerization treatment, separating the resulting solids from the solution and washing with n-hexane, to obtain a solid product (II) subjected to a multi-stage polymerization treatment with propylene and 3-methylbutene-1.

The total quantity of the solid product (II) was mixed with TiCl$_4$ (10 l), followed by adding diisobutyl phthalate (350 g), reacting the mixture with stirring at 110° C. for 2 hours, removing the resulting liquid phase portion by decantation at the same temperature, and again adding TiCl$_4$ (1,000 ml) to carry out heating reaction at 110° C. for 2 hours.

After completion of the reaction, the resulting liquid phase portion was removed by decantation at the same temperature, followed by washing the resulting solids with n-decane and n-hexane at 80° C. and drying to obtain a solid product (III) as a final titanium catalyst component. The contents of the propylene polymer block, the 3-methylbutene-1 polymer block and titanium were 30.0% by weight, 20.0% by weight and 1.5% by weight, respectively.

In a 200 l capacity polymerization vessel provided with a stirrer having two-stage turbine elements, n-hexane was added to the above titanium catalyst component to prepare a 4.0% by weight n-hexane suspension, followed by continuously feeding the suspension at a rate of 0.39 mg atom/hr calculated in terms of titanium atom,, triethylaluminum at a rate of 8.5 g/hr and diphenyldimethoxysilane at a rate of 3.0 g/hr, each through the same piping and n-hexane at a rate of 21 Kg/hr through a separate piping, further feeding hydrogen gas so as to keep its concentration in gas phase at 0.25% by volume and propylene so as to keep the total pressure at 8 Kg/cm$^2$G to continuously carry out slurry polymerization of propylene at 70° C. over 120 hours.

During the polymerization period, the resulting slurry was continuously withdrawn from the polymerization vessel into a 50 l capacity flash tank so as to give a level of the slurry retained in the polymerization vessel, of 75% by volume.

The pressure of the slurry was dropped in the flash tank to remove unreacted propylene, while methanol was fed at a rate of 1 Kg/hr, to subject them to contact treatment at 70° C., followed by removing the solvent from the slurry by means of a centrifuge, and drying the resulting material by a dryer to continuously obtain a product powder at a rate of 10 Kg/hr.

COMPARATIVE EXAMPLE 17

Example 15 was repeated except that the solid product (I) was made a substance corresponding to the solid product (II) without subjecting it to polymerization treatment with propylene and 3-methylbutene-1 to obtain a titanium catalyst component, with which slurry polymerization of propylene was carried out in the same manner as in Example 15.

EXAMPLE 16

Example 10 (1) was repeated except that anhydrous MgCl$_2$ was replaced by magnesium ethoxide (580 g), the quantity of propylene used was made 85 g and vinylcyclohexane was replaced by p-trimethylsilylstyrene (1.6 Kg) to obtain a solid product (III), and using the solid product (III) as a final titanium catalyst component, gas phase polymerization of propylene was carried out in the same manner as in Example 10 (2) and (3).

COMPARATIVE EXAMPLE 18

Example 16 was repeated except that the solid product (I) was made into a substance corresponding to the solid product (II) without subjecting it to polymerization treatment with propylene and p-trimethylsilylstyrene, to obtain a titanium catalyst component, with which propylene was polymerized.

EXAMPLE 17

Example 10 (1) was repeated except that n-butyl o-titanate was replaced by n-butyl polytitanate (pentamer) (1.2 Kg), the quantity of propylene used was made 240 g and vinylcyclohexane was replaced by 2-methyl-4-fluorostyrene (2.7 Kg), to obtain a titanium catalyst component. Using the titanium catalyst component, propylene polymerization was carried out in the same manner as in Example 10 (2) and (3).

COMPARATIVELY EXAMPLE 19

Example 17 was repeated except that the solid product (I) was made into a substance corresponding to the solid product (II) without subjecting it to polymerization treatment with propylene and 2-methyl-4fluorostyrene, to obtain a titanium catalyst component, with which propylene was polymerized.

EXAMPLE 18

(1) Example 10 (1) was repeated except that ethylene (950 Nl) in place of propylene was fed over one hour, followed by subjecting the resulting solid product (I) to a first stage polymerization treatment, removing unreacted ethylene, adding vinylcyclohexane (730 g) without washing the resulting reaction mixture and carrying out a second stage polymerization treatment at 40° C. for 2 hours, to obtain a solid product (III) as a titanium catalyst component of the present invention.

(2) Example 10 (2) was repeated except that the titanium catalyst component obtained above in the item (1) was used as a titanium catalyst component, to obtain a preactivated catalyst component.

(3) Example 10 (3) was repeated except that the preactivated catalyst component obtained above in the item (2) was used as a preactivated catalyst component and ethylene was further fed so as to keep its concentration in the gas phase of the polymerization vessel at 0.2% by volume at the time of gas phase polymerization of propylene, to carry out propylene-ethylene copolymerization and thereby obtain a propylene-ethylene copolymer.

COMPARATIVE EXAMPLE 20

Example 18 was repeated except that a titanium catalyst component was obtained without carrying out the multi-stage polymerization treatment with ethylene and vinylcyclohexane, of Example 18 (1), and the titanium catalyst component was used, to obtain a propylene-ethylene copolymer.

The titanium catalyst component, polymerization results and evaluation results of the above Examples and Comparative examples are shown in Table 2.

TABLE 2

| Nos. of Examples and Comparative examples | Titanium catalyst component | | | | Polymerization results | | | | Evaluation results | | | Void |
|---|---|---|---|---|---|---|---|---|---|---|---|---|
| | Linear olefin polymer block | | Non-linear olefin polymer block | | TY (Kg/gram atom) | II (wt. %) | BD (g/ml) | MFR (g/10 min) | Inside haze (%) | Crystallization temp. (°C.) | Flexural elastic modulus (kgf/cm²) | |
| | Name of linear olefin | Content (wt. %) | Name of non-linear olefin | Content (wt. %) | | | | | | | | |
| Ex. 10 | Propylene | 30.8 | Vinylcyclohexane | 30.8 | 35000 | 98.5 | 0.42 | 1.9 | 1.5 | 130.5 | 14600 | ○ |
| Com.ex. 11 | — | — | — | — | 33800 | 98.0 | 0.40 | 2.0 | 11.8 | 118.4 | 11800 | ○ |
| Com.ex. 12 | (*1) | — | (*1) | — | 23700 | 97.0 | 0.32 | 1.4 | 2.9 | 125.2 | 12800 | X |
| Com.ex. 13 | — | — | (*2) | (44.4) | 33600 | 98.0 | 0.39 | 1.9 | 3.0 | 125.3 | 12800 | X |
| Com.ex. 14 | Propylene | 0.01 | Vinylcyclohexane | 0.001 | 33900 | 98.0 | 0.40 | 2.0 | 10.2 | 118.9 | 11900 | ○ |
| Ex. 11 | " | 48.8 | Vinylcyclohexane | 2.4 | 34300 | 98.3 | 0.41 | 1.9 | 3.1 | 124.5 | 13200 | ○ |
| Ex. 12 | " | 48.8 | Vinylcyclohexane | 47.6 | 34800 | 98.5 | 0.41 | 1.8 | 1.5 | 130.6 | 14600 | ○ |
| Ex. 13 | Propylene | 15.0 | Allyltrimethylsilane | 35.0 | 32700 | 98.2 | 0.41 | 1.8 | 1.4 | 130.3 | 14100 | ○ |
| Com.ex. 15 | — | — | — | — | 30600 | 97.8 | 0.39 | 1.8 | 11.8 | 118.0 | 11700 | ○ |
| Ex. 14 | Propylene | 25.0 | 4,4-Dimethylpentene-1 | 25.0 | 34100 | 98.2 | 0.38 | 1.9 | 1.8 | 129.4 | 13400 | ○ |
| Com.ex. 16 | — | — | — | — | 33000 | 97.7 | 0.37 | 1.9 | 11.8 | 118.3 | 11500 | ○ |
| Ex. 15 | Propylene | 30.0 | 3-Methylbutene-1 | 20.0 | 25600 | 98.3 | 0.46 | 1.7 | 1.6 | 130.0 | 14000 | ○ |
| Com.ex. 17 | — | — | — | — | 25200 | 98.1 | 0.45 | 1.7 | 11.9 | 118.2 | 11700 | ○ |
| Ex. 16 | Propylene | 4.8 | p-Trimethylsilylstyrene | 47.6 | 35200 | 97.5 | 0.39 | 1.9 | 2.4 | 128.0 | 13500 | ○ |
| Com.ex. 18 | — | — | — | — | 35000 | 97.4 | 0.38 | 1.9 | 12.0 | 118.3 | 11700 | ○ |
| Ex. 17 | Propylene | 17.6 | 2-Methyl-4-fluorostyrene | 23.5 | 33600 | 98.2 | 0.41 | 1.9 | 2.8 | 127.5 | 13500 | ○ |
| Com.ex. 19 | — | — | — | — | 33400 | 98.1 | 0.40 | 2.0 | 12.2 | 118.2 | 11600 | ○ |
| Ex. 18 | Ethylene | 30.8 | Vinylcyclohexane | 30.8 | 35200 | 97.5 | 0.40 | 1.8 | 1.2 | 127.7 | 13500 | Δ |
| Com.ex. 20 | — | — | — | — | 34000 | 97.2 | 0.38 | 1.8 | 8.7 | 116.5 | 10800 | ○ |

(*1) For preactivating the catalyst, vinylcyclohexane (quantity reacted per g of Ti catalyst component: 0.8 g) and propylene (quantity reacted per g of Ti catalyst component: 0.8 g) were used.
(*2) At the time of producing Ti catalyst component, a vinylcyclohexane polymer separately obtained by polymerization was added.

The main effectiveness of the above items (10) to (18) of the present invention consists in that when the titanium catalyst composition of the present invention is used as a transition metal compound catalyst component for producing olefin polymers, in olefin polymerization, it is possible to produce a highly crystalline olefin polymer having few occurrence of voids and a superior transparency when made into film, without causing any operational problems and with a high productivity.

As apparent from the above Examples, when olefin polymers are produced using the titanium catalyst component composition of the present invention, no problem on production is raised and a long term, stabilized production is possible.

Further, films produced from the resulting olefin polymer have an inside haze of 1.2 to 3.1%, that is, a very high transparency, as compared with about 9 to 12% of films produced using conventional olefin polymers produced using a titanium catalyst component containing no specified block polymer.

Further, the crystallization temperature has been raised by about 6° to 12° C. to notably improve the crystallinity so that the flexural elastic modulus has also been improved (see Examples 10-18 and Comparative examples 11 and 15 to 20).

Whereas, according to a conventional process in which a non-linear olefin polymer is introduced in a manner other than that of the present invention, such problems are raised that operational problems occur and when the resulting polymer is made into films, voids very often occur and improvements in the transparency and crystallinity are also insufficient due to inferior dispersibility (see Comparative examples 12 and 13).

What we claim is:

1. A process for producing a titanium trichloride composition for producing olefin polymers, which process comprises reacting $TiCl_4$ with an organoaluminum compound or a reaction product (I) of an organoaluminum compound wi&h an electron donor ($B_1$) to form a solid product (II), subjecting said solid product (II) to a multi-stage polymerization treatment once or more with each of ① a linear olefin and ② a non-linear olefin to form a linear olefin-non-linear olefin block copolymer, and further reacting said block copolymer with an electron donor ($B_2$) and an electron acceptor to form a solid product (III), the content of said linear olefin polymer block in said (III) being made 10.0 to 49.3% by weight and that of said non-linear olefin polymer block therein being made 1.5 to 47.6% by weight and the ratio by weight of said linear olefin polymer block to said non-linear olefin polymer block being 2/98 to 98/2.

2. A production process according to claim 1 wherein said organoaluminum compound is the one expressed by the formula

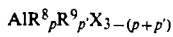

wherein $R^8$ and $R^9$ each represent a hydrocarbon radical selected from alkyl group, cycloalkyl group or aryl group or an alkoxy group, X represents a halogen atom and p and p' each represent an optional number satisfying an expression of $$0 < p+p' \leq 3.$$

3. A production process according to claim 1 wherein said non-linear olefin is a branched olefin expressed by the formula

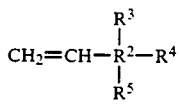

wherein $R^2$ represents a linear hydrocarbon radical of 1 to 3 carbon atoms which may contain silicon or silicon, and $R^3$, $R^4$ and $R^5$ each represent a linear hydrocarbon radical of 1 to 6 carbon atoms which may contain silicon and any one of $R^3$, $R^4$ and $R^5$ may be hydrogen atom.

4. A production process according to claim 1 wherein said non-linear olefin is a saturated ring-containing hydrocarbon monomer of 3 to 18 carbon atoms expressed by the formula of $CH_2=CH-R^1$ and $R^1$ is selected from the group consisting of (a) saturated ring-containing hydrocarbon monomers, (b) saturated ring-containing hydrocarbon monomers having silicon atoms in the saturated ring structure, and (c) saturated ring-containing hydrocarbon monomers having silicon atoms outside the saturated ring structure.

5. A production process according to claim 1 wherein said non-linear olefin is an aromatic monomer expressed by the formula

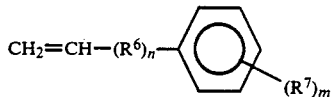

wherein n represents 0 or 1, m represents 1 or 2, $R^6$ represents a linear hydrocarbon radical of 1 to 6 carbon atoms which may contain silicon, $R^7$ represents a hydrogen atom, a halogen atom or a hydrocarbon radical of 1 to 12 carbon atoms which may contain silicon, and when m is 2 the $R^7$s may be the same or different.

6. The titanium trichloride composition produced by the process of claim 1.

7. The titanium trichloride composition produced by the process of claim 2.

8. The titanium trichloride composition produced by the process of claim 4.

9. The titanium trichloride composition produced by the process of claim 3.

10. The titanium trichloride composition produced by the process of claim 5.

* * * * *